US012678891B2

(12) United States Patent     (10) Patent No.:   US 12,678,891 B2

Nomoto                      (45) Date of Patent:       Jul. 14, 2026

(54) WAFER MANUFACTURING METHOD

(71) Applicant: DISCO CORPORATION, Tokyo (JP)

(72) Inventor: Asahi Nomoto, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 71 days.

(21) Appl. No.: 18/430,080

(22) Filed: Feb. 1, 2024

(65)          Prior Publication Data

US 2024/0269768 A1     Aug. 15, 2024

(30)       Foreign Application Priority Data

Feb. 10, 2023    (JP) ................................. 2023-019244
   Dec. 26, 2023   (JP) ................................. 2023-218899

(51) Int. Cl.
    *B23K 26/00*        (2014.01)
    *B23K 26/0622*     (2014.01)
    *B23K 101/40*      (2006.01)
(52) U.S. Cl.
    CPC ...... *B23K 26/0622* (2015.10); *B23K 2101/40*
                                    (2018.08)
(58) Field of Classification Search
    CPC .............................. B23K 26/53; B23K 26/355
    See application file for complete search history.

(56)           References Cited

U.S. PATENT DOCUMENTS

2014/0065360 A1*   3/2014   D'Evelyn ............... C30B 25/02
                                                     428/141
2017/0341179 A1*   11/2017   Hirata ..................... B23K 26/10
2018/0056440 A1*   3/2018   Yamamoto ........... B28D 5/0011
                         (Continued)

FOREIGN PATENT DOCUMENTS

JP        2000094221 A     4/2000
JP        2011077413 A   *   4/2011
             (Continued)

OTHER PUBLICATIONS

Tanaka, A., Sugiura, R., Kawaguchi, D., Wani, Y., Watanabe, H., Sena, H., Ando, Y., Honda, Y., Igasaki, Y., Wakejima, A. and Ando, Y., 2022. Laser slice thinning of GaN-on-GaN high electron mobility transistors. Scientific reports, 12(1), p. 7363. (Year: 2022).*

(Continued)

*Primary Examiner* — Nicholas Krasnow

(74) *Attorney, Agent, or Firm* — Greer, Burns & Crain, Ltd

(57)            ABSTRACT

A wafer manufacturing method includes a separation layer forming step of forming a separation layer including a plurality of modified regions within a workpiece by moving the workpiece and a condensing point of a pulsed laser beam having a wavelength transmittable through the workpiece relative to each other at a predetermined speed along a processing feed direction in a state in which the workpiece is irradiated with the laser beam, and the condensing point of the laser beam is located at a predetermined depth position of the workpiece, and a separating step of separating a wafer from the workpiece with the separation layer as a starting point, in the separation layer forming step, a repetition frequency of the laser beam is set according to pulse energy and the relative predetermined speed between the workpiece and the condensing point such that the separation layer can be formed.

19 Claims, 15 Drawing Sheets

(56) References Cited

U.S. PATENT DOCUMENTS

2021/0323098 A1*  10/2021  Nomoto .................. B28D 5/04
2022/0254638 A1*   8/2022  Tanoue .................. H10P 34/42
2025/0313992 A1*  10/2025  Iso ........................ H10D 62/60

FOREIGN PATENT DOCUMENTS

JP          2013124206  A  *  6/2013
JP          2016111143  A     6/2016

OTHER PUBLICATIONS

Sena, H., Tanaka, A., Wani, Y., Aratani, T., Yui, T., Kawaguchi, D.,
Sugiura, R., Honda, Y., Igasaki, Y. and Amano, H., 2021. Gallium
nitride wafer slicing by a sub-nanosecond laser: effect of pulse
energy and laser shot spacing. Applied Physics A, 127(9), p .648.
(Year: 2021).*

* cited by examiner

FIG.14A
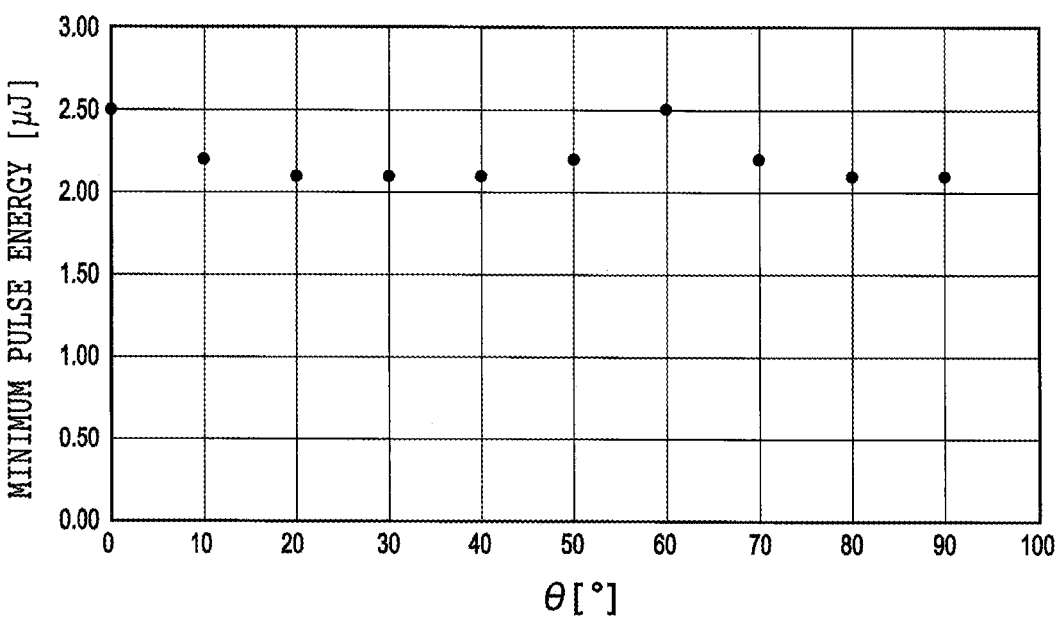
FIG.14B
FIG.14C
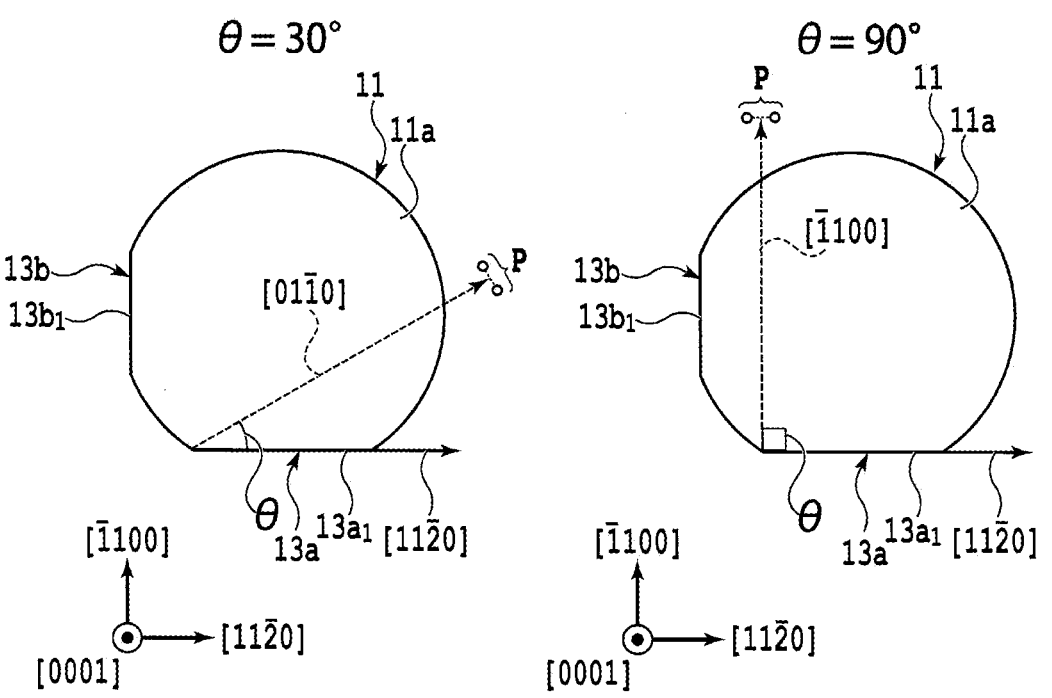

WAFER MANUFACTURING METHOD

BACKGROUND OF THE INVENTION

Field of the Invention

The present invention relates to a wafer manufacturing method for manufacturing, from a workpiece as an ingot of gallium nitride or a substrate of gallium nitride, a wafer having a thickness smaller than the thickness of the work- piece.

Description of the Related Art

Gallium nitride (GaN) is referred to as a wide band gap semiconductor and has a band gap approximately three times that of silicon (Si). Utilizing this relatively large band gap of GaN, devices such as power devices and light emitting diodes (LEDs) are manufactured. A single crystal substrate (that is, a wafer) of GaN is generally manufactured by slicing an ingot of GaN and thereby cutting out the wafer from the ingot. At a time of manufacturing this wafer, a wire saw that cuts out a plurality of wafers from the ingot at a time, for example, is used (see Japanese Patent Laid-Open No. 2000-94221, for example).

However, a cutting margin (for example, 0.30 mm) of the wire saw is large relative to the thickness (for example, 0.15 mm) of the wafer. In addition, lapping, etching, polishing, and the like need to be performed in order to flatten a surface of the cut-out wafer. In a case where the wire saw is thus used, a volume of the ingot that is usable as wafers is, for example, approximately ⅓ of the ingot, and approximately the remaining ⅔ is discarded. Hence, productivity of wafers in the case where the wire saw is used is relatively low.

On the other hand, a method has been proposed which separates a wafer from the ingot by using a pulsed laser beam having a wavelength transmittable through the ingot, and thereby improves the productivity of wafers (see Japanese Patent Laid-Open No. 2016-111143, for example). Specifically, in a state in which a condensing point of the laser beam is positioned at a predetermined depth position of the ingot which depth position corresponds to the thickness of the wafer, a separation layer including modified regions and cracks extending with the modified regions as a starting point is formed within the ingot by moving the condensing point and the ingot relative to each other. The wafer is thereafter separated from the ingot with the separation layer as a starting point.

The usage of the laser beam can reduce a ratio of the volume of the ingot discarded when wafers are manufac- tured from the ingot (that is, a discard rate), and can consequently improve the productivity of the wafers. How- ever, the method using the laser beam is of a generally-called single wafer type that manufactures wafers one by one from the ingot. There is thus a possibility of a decrease in the number of wafers manufactured per unit time (that is, throughput) as compared with the method using the wire saw.

In order to improve the throughput in the method using the laser beam, a peak power of the laser beam, for example, may be raised. That is, when a peak power of each pulse constituting the laser beam is raised, the separation layer can be formed even in a case where a relative speed between the condensing point of the laser beam and the ingot is raised. A processing time can therefore be shortened.

However, in order to raise the peak power, a laser oscil- lator, for example, needs to be increased in size. A laser processing apparatus becomes correspondingly larger and more expensive. In addition, when a high-power laser beam is used, optical parts such as a lens constituting an optical system tend to be damaged, and optical characteristics thereof tend to be degraded.

SUMMARY OF THE INVENTION

The present invention has been made in view of such problems. It is an object of the present invention to prevent an extreme decrease in the throughput even when a laser beam of a relatively low power is used in a case where a separation layer is formed in an ingot or the like of gallium nitride by using the laser beam transmittable through gal- lium nitride.

In accordance with an aspect of the present invention, there is provided a wafer manufacturing method for manu- facturing, from a workpiece as an ingot of gallium nitride or a single crystal substrate of gallium nitride, a wafer of gallium nitride having a thickness smaller than a thickness of the workpiece. The wafer manufacturing method includes a holding step of holding one surface side of the workpiece by a holding table, a separation layer forming step of forming a separation layer including a plurality of modified regions within the workpiece by moving the workpiece and a condensing point of a pulsed laser beam having a wave- length transmittable through the workpiece relative to each other at a predetermined speed along a processing feed direction in a state in which the workpiece is irradiated with the pulsed laser beam from another surface side of the workpiece, the other surface side being located on an opposite side from the one surface of the workpiece, and the condensing point of the pulsed laser beam is located at a predetermined depth position of the workpiece, and a sepa- rating step of separating the wafer from the workpiece with the separation layer as a starting point. In the separation layer forming step, a repetition frequency of the pulsed laser beam is set according to pulse energy as energy of the pulsed laser beam per pulse and the relative predetermined speed between the workpiece and the condensing point such that the separation layer can be formed.

Preferably, the repetition frequency is a frequency defined by a reciprocal of a cycle of a plurality of pulse groups in the laser beam in a burst mode.

In addition, preferably, in the separation layer forming step, the repetition frequency of the pulsed laser beam is set to be equal to or higher than 25 kHz.

In addition, preferably, in the separation layer forming step, the repetition frequency of the pulsed laser beam is set to be equal to or higher than 50 kHz.

In addition, preferably, in the separation layer forming step, the predetermined speed is set such that a distance between the plurality of modified regions adjacent to each other along the processing feed direction is equal to or less than 17.5 μm.

In addition, preferably, in the separation layer forming step, a lower limit value of the pulse energy of the pulsed laser beam per pulse is set to be equal to or higher than 1.60 μJ and equal to or lower than 4.00 μJ.

In addition, preferably, an angle formed between the processing feed direction in the separation layer forming step and crystal directions illustrated in the following (1) in the (0001) plane of the workpiece is equal to or less than 10°.

[Math. 1]

$$< 10\overline{1}0 > \tag{1}$$

In the separation layer forming step of the substrate manufacturing method according to one aspect of the present invention, the repetition frequency of the pulsed laser beam is set so as to be able to form the separation layer according to the pulse energy as the energy of the pulsed laser beam per pulse and the relative predetermined speed between the workpiece and the condensing point. That is, even in a case where the pulse energy is relatively decreased and the relative predetermined speed between the workpiece and the condensing point is relatively raised (that is, throughput is increased), the separation layer can be formed by setting the repetition frequency relatively high. Hence, an extreme decrease in the throughput can be prevented.

The above and other objects, features and advantages of the present invention and the manner of realizing them will become more apparent, and the invention itself will best be understood from a study of the following description and appended claims with reference to the attached drawings illustrating a preferred embodiment of the invention.

BRIEF DESCRIPTION OF THE DRAWINGS

FIG. 8A is a diagram illustrating a separating step;

FIG. 8B is a diagram illustrating a wafer separated from the ingot and the like;

FIG. 14A is a graph illustrating minimum pulse energy with which the cracks are formed with respect to the angle θ;

FIG. 14B is a plan view of the ingot in a case where θ=30°;

FIG. 14C is a plan view of the ingot in a case where θ=90°; and

DETAILED DESCRIPTION OF THE PREFERRED EMBODIMENT

Figure 1:
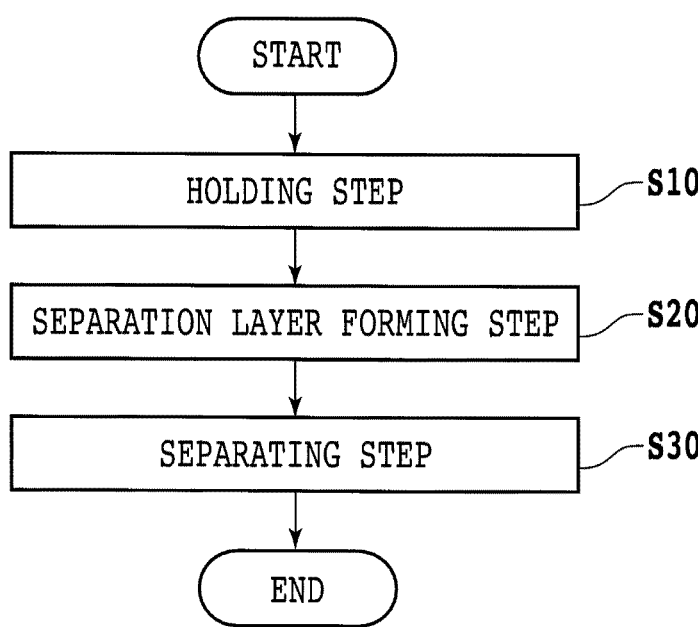
FIG. 1 is a flowchart of a wafer manufacturing method.

An embodiment according to one aspect of the present invention will be described with reference to the accompanying drawings. FIG. 1 is a flowchart of a manufacturing method for manufacturing, from an ingot (workpiece) 11 of GaN illustrated in FIG. 2 and the like, a wafer 15 of GaN (see FIG. 8B) which wafer has a thickness less than the thickness of the ingot 11. The present embodiment manufactures the wafer 15 by sequentially performing a holding step S10, a separation layer forming step S20, and a separating step S30 illustrated in FIG. 1.

Figure 2:
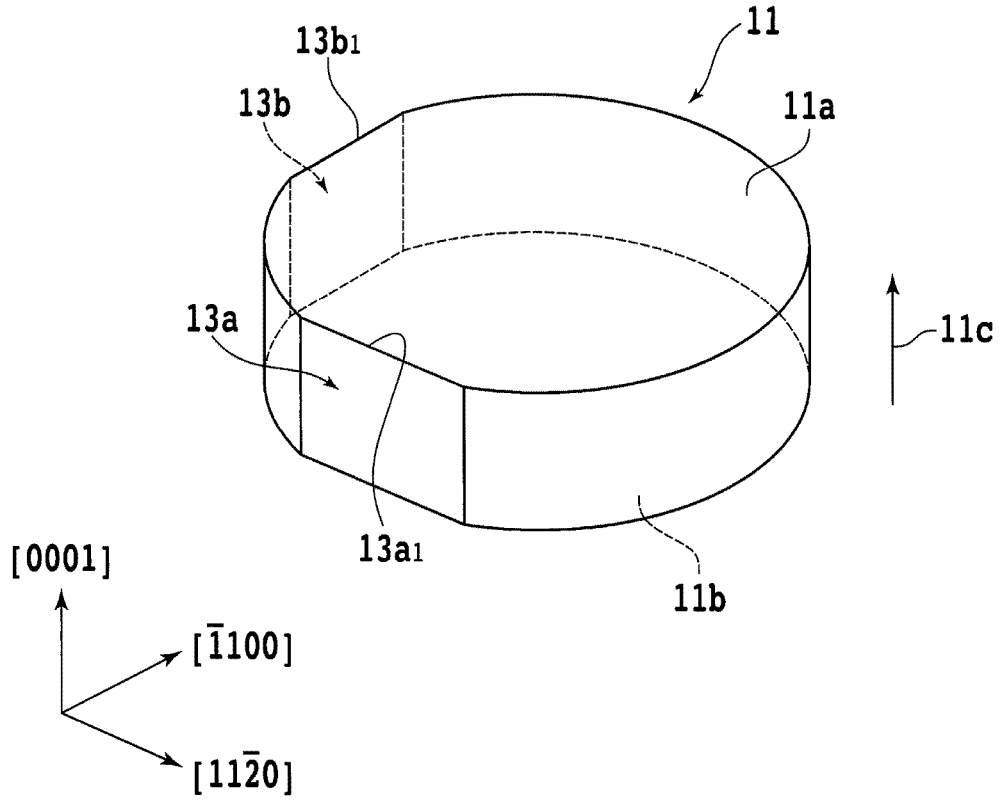
FIG. 2 is a perspective view of an ingot.

First, the ingot 11 will be described with reference to FIG. 2. FIG. 2 is a perspective view of the ingot 11. The ingot 11 is a single crystal of GaN having a hexagonal crystal structure. However, the conductivity type of the ingot 11 is not particularly limited. The ingot 11 may be of a p-type including a p-type impurity such as magnesium (Mg) or beryllium (Be), or may be of an n-type including an n-type impurity such as silicon (Si) or germanium (Ge).

The ingot 11 in the present embodiment has a diameter of 4 inches (approximately 100 mm) and a thickness of 500 μm. However, the diameter and thickness of the ingot 11 are not limited to the values. The ingot 11 has a first surface (another surface) 11a and a second surface (one surface) 11b that is located on an opposite side from the first surface 11a in a thickness direction 11c and is parallel with the first surface 11a. The first surface 11a corresponds to a c-plane illustrated in the following (2).

[Math. 2]

$$(0001) \tag{2}$$

In the present specification, crystal planes and crystal directions are identified by using Miller-Bravais indices. A specific crystal plane is represented by using ( ), but may be represented as a ( ) plane for convenience. In addition, crystal planes equivalent to each other due to the symmetry of a crystal structure are represented by using { }. Similarly, a specific crystal direction is represented by using [ ], and crystal directions equivalent to each other are represented by using < >. A crystal direction that is perpendicular to the first surface 11a (c-plane) and is oriented upward is represented by the following (3). This crystal direction is parallel with a c-axis and corresponds to the thickness direction 11c of the ingot 11.

[Math. 3]

$$[0001] \tag{3}$$

The ingot 11 in the present embodiment has a plurality of flat surfaces on a side surface thereof. More specifically, the ingot 11 has a first side surface 13a and a second side surface 13b in an orthogonal positional relation to each other. The first side surface 13a corresponds to a crystal plane illustrated in the following (4). The second side surface 13$b$ corresponds to a crystal plane illustrated in the following (5).

[Math. 4]

$$(\bar{T}100) \tag{4}$$

[Math. 5]

$$(11\bar{2}0) \tag{5}$$

A first orientation flat 13$a_1$ where the first surface 11$a$ and the first side surface 13$a$ intersect each other is parallel with a crystal direction in the following (6).

[Math. 6]

$$[11\bar{2}0] \tag{6}$$

In addition, a second orientation flat 13$b_1$ where the first surface 11$a$ and the second side surface 13$b$ intersect each other is parallel with a crystal direction in the following (7).

[Math. 7]

$$[\bar{T}100] \tag{7}$$

Figure 3:
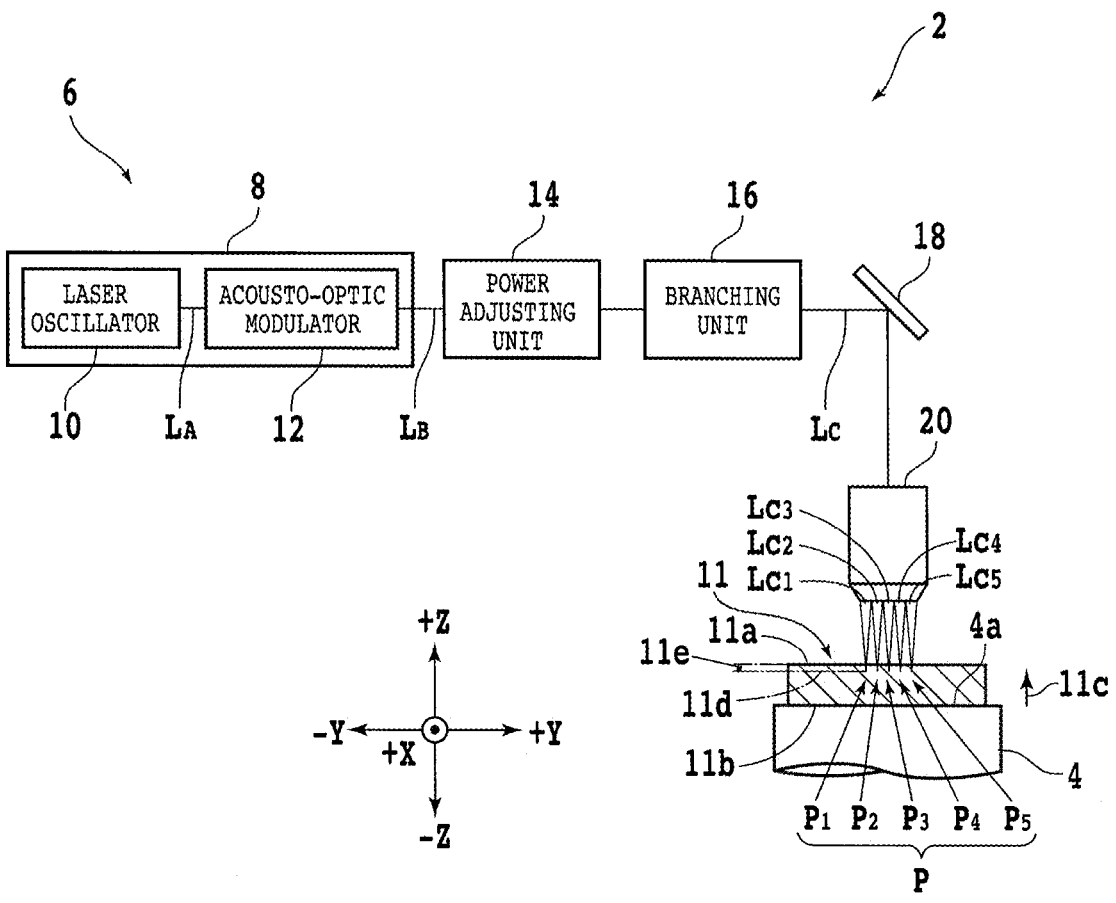
FIG. 3 is a schematic diagram of a laser processing apparatus.

Next, referring to FIG. 3, description will be made of a laser processing apparatus 2 for subjecting the ingot 11 to laser processing. FIG. 3 is a schematic diagram of the laser processing apparatus 2. In FIG. 3, a plurality of constituent elements of the laser processing apparatus 2 are illustrated in a functional block or in a simplified shape. An X-axis direction (a processing feed direction and a predetermined direction), a Y-axis direction (indexing feed direction), and a Z-axis direction (a height direction and a vertical direction) illustrated in FIG. 3 are orthogonal to each other. Incidentally, in the present specification, the X-axis direction is parallel with a +X direction and a −X direction as directions opposite from each other. Similarly, the Y-axis direction is parallel with a +Y direction and a −Y direction as directions opposite from each other, and the Z-axis direction is parallel with a +Z direction and a −Z direction as directions opposite from each other.

The laser processing apparatus 2 has a chuck table (holding table) 4 in a disk shape. The chuck table 4 has a frame body in a disk shape, which is formed of a metal such as stainless steel. A recessed portion in a disk shape (not illustrated), which has a smaller diameter than the diameter of the frame body, is formed in a central portion of the frame body. A porous plate in a disk shape (not illustrated), which is formed of a porous ceramic, is fixed to this recessed portion.

A predetermined flow passage (not illustrated) is formed in the frame body. A suction source (not illustrated) such as a vacuum pump is connected to the predetermined flow passage via a tube portion (not illustrated) or the like. When a negative pressure generated by the suction source is transmitted to the porous plate, the negative pressure occurs on the upper surface of the porous plate. The annular upper surface of the frame body and the circular upper surface of the porous plate are substantially flush with each other and are substantially flat, and function as a holding surface 4$a$ for sucking and holding the ingot 11. The holding surface 4$a$ is disposed in parallel with an XY plane.

A rotational driving mechanism (not illustrated) that rotates the chuck table 4 is provided to a lower portion of the chuck table 4. The rotational driving mechanism can rotate the chuck table 4 by a predetermined angle with a predetermined rotational axis along the Z-axis direction as a rotational center thereof. The chuck table 4 and the rotational driving mechanism are supported by a horizontal direction moving mechanism (not illustrated).

The horizontal direction moving mechanism includes an X-axis direction moving mechanism and a Y-axis direction moving mechanism that are each of a ball screw type. The horizontal direction moving mechanism can thus move the chuck table 4 and the rotational driving mechanism along the X-axis direction and the Y-axis direction. For example, the X-axis direction moving mechanism is used to processing-feed the chuck table 4 along the X-axis direction, and the Y-axis direction moving mechanism is used to indexing-feed the chuck table 4 along the Y-axis direction. A laser beam irradiating unit 6 is provided above the holding surface 4$a$.

The laser beam irradiating unit 6 includes a laser beam generating unit 8. The laser beam generating unit 8 includes a laser oscillator 10. The laser oscillator 10 has, for example, Nd:YAG, Nd:YVO$_4$, or the like as a laser medium. The laser oscillator 10 emits a laser beam L$_A$ of single pulses (whose repetition frequency is a few ten MHz, for example) having a wavelength (1064 nm, for example) transmittable through the ingot 11 of GaN.

The single pulse laser beam L$_A$ emitted from the laser oscillator 10 is converted into a laser beam L$_B$ of burst pulses (that is, in a burst mode) in an acousto-optic modulator (AOM) 12. The acousto-optic modulator 12 operates according to an electric signal input to the acousto-optic modulator 12 and deflects the laser beam L$_A$ for a predetermined time according to the signal. Consequently, the burst pulse laser beam L$_B$ in a state in which the laser beam L$_A$ is thinned out for the predetermined time is emitted from the acousto-optic modulator 12 to a power adjusting unit 14.

Figure 4A:
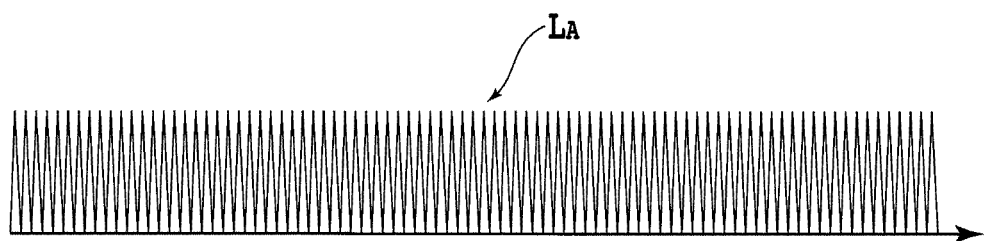
FIG. 4A is a schematic diagram of a laser beam $L_A$.
Figure 4B:
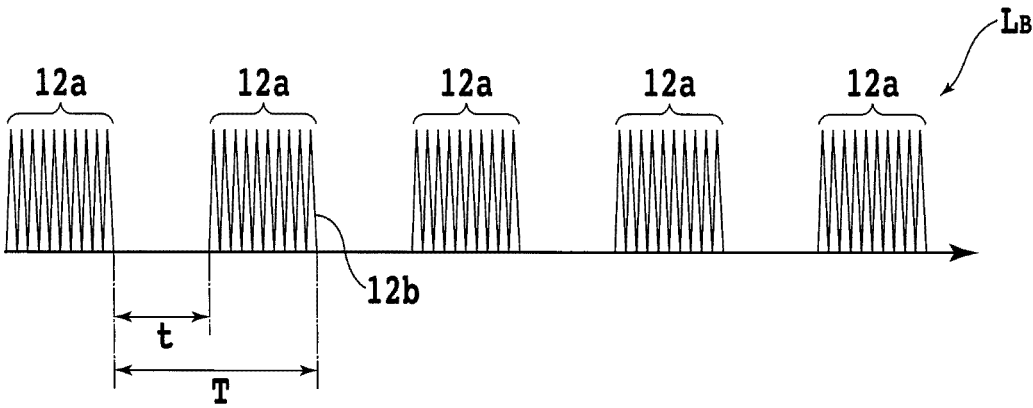
FIG. 4B is a schematic diagram of a laser beam $L_B$.

FIG. 4A is a schematic diagram of the single pulse laser beam L$_A$ that enters the acousto-optic modulator 12 from the laser oscillator 10. FIG. 4B is a schematic diagram of the burst pulse laser beam L$_B$ that enters the power adjusting unit 14 from the acousto-optic modulator 12. Incidentally, in FIG. 4A and FIG. 4B, an axis of abscissas indicates time, and an axis of ordinates indicates power (W). As illustrated in FIG. 4B, the acousto-optic modulator 12 converts the laser beam L$_A$ into the burst pulse laser beam L$_B$ in which a pulse group 12$a$ including a plurality of minimum unit pulses 12$b$ is repeated in a predetermined cycle T.

A time interval t that corresponds to an interval between the pulse groups 12$a$ is, for example, a few ten μs to a few hundred μs. The cycle T of the plurality of pulse groups 12$a$ is longer than the time interval t. A repetition frequency f defined by a reciprocal of the cycle T is, for example, a predetermined value equal to or higher than 1 kHz and equal to or lower than 100 kHz. Each of the pulse groups 12$a$ includes, for example, 10 minimum unit pulses 12$b$. However, the number of minimum unit pulses 12$b$ included in the pulse group 12$a$ is not limited to 10. Returning to FIG. 3, the description of the laser processing apparatus 2 will be continued.

The laser beam L$_B$ is emitted from the laser beam generating unit 8, is then adjusted to an appropriate power by the power adjusting unit 14 including an attenuator or the like, and is thereafter spatially branched by a branching unit 16. The branching unit 16 in the present embodiment includes an liquid crystal on silicon-spatial light modulator (LCOS-SLM) (not illustrated). However, the branching unit 16 may include a diffraction grating in place of the LCOS-SLM. In FIG. 3, the spatially branched laser beam $L_B$ is represented by a laser beam $L_C$.

The laser beam $L_C$ passed through the branching unit 16 is passed through a collimator lens (not illustrated), a mirror 18, and the like, and is guided to an irradiation head 20. The irradiation head 20 includes a condensing lens (not illustrated). The condensing lens condenses the laser beam $L_C$ at a predetermined depth position of the ingot 11 sucked and held by the holding surface 4a. The laser beam $L_C$ illustrated in FIG. 3 is branched into a plurality of laser beams $L_{C1}$, $L_{C2}$, $L_{C3}$, $L_{C4}$, and $L_{C5}$ by the branching unit 16. Each of the plurality of laser beams $L_{C1}$, $L_{C2}$, $L_{C3}$, $L_{C4}$, and $L_{C5}$ is a pulsed laser beam having the same repetition frequency f as the laser beam $L_B$.

Respective condensing points P ($P_1$, $P_2$, $P_3$, $P_4$, and $P_5$) of the laser beams $L_{C1}$ to $L_{C5}$ are arranged so as to be aligned with each other along the Y-axis direction at a predetermined depth position of the ingot 11. Intervals between the plurality of condensing points P aligned with each other along the Y-axis direction are set at a predetermined value equal to or more than 5 μm and equal to or less than 20 μm (12.5 μm, for example). Incidentally, in the example illustrated in FIG. 3, the number of branches of the laser beam $L_C$ is 5 for the convenience of description. However, the number of branches is not limited to 5. The number of branches may be equal to or more than 2 and equal to or less than 16. The number of branches in a preferable example is 10. As will be described later, the laser beam $L_C$ whose number of branches is 10 is expressed by a laser beam $L_{Ci}$ (i is a natural number of 1 to 10).

An imaging unit (not illustrated) is provided to a casing (not illustrated) of the laser beam irradiating unit 6. The imaging unit includes a light emitting device (not illustrated) that emits light downward along the Z-axis direction. The light emitting device includes a light emitting element such as an LED that functions as a light source. The light emitting device emits, for example, light having a wavelength of visible rays. The imaging unit further includes an imaging element (not illustrated) that receives reflected light of the light applied from the light emitting device via a lens (not illustrated). The imaging element photoelectrically converts the wavelength of the light from the light emitting device. The imaging element is a charge-coupled device (CCD) image sensor, a complementary metal-oxide-semiconductor (CMOS) image sensor, or the like. The light emitting device, the lens, the imaging element, and the like constitute a microscope camera unit that images a subject by visible light.

The operation of the chuck table 4, the rotational driving mechanism, the horizontal direction moving mechanism, the laser beam irradiating unit 6, and the like described above is controlled by a controller not illustrated. The controller is constituted by, for example, a computer including a processor (processing apparatus) typified by a central processing unit (CPU) and a memory (storage apparatus). The memory includes a main storage apparatus such as a dynamic random access memory (DRAM), a static random access memory (SRAM), or a read only memory (ROM) as well as an auxiliary storage apparatus such as a flash memory, a hard disk drive, or a solid-state drive. The auxiliary storage apparatus stores software including a predetermined program. Functions of the controller are implemented by making the processing apparatus or the like operate according to the software. Next, a method of manufacturing the wafer 15 will be described according to the procedure illustrated in FIG. 1.

Figure 5:
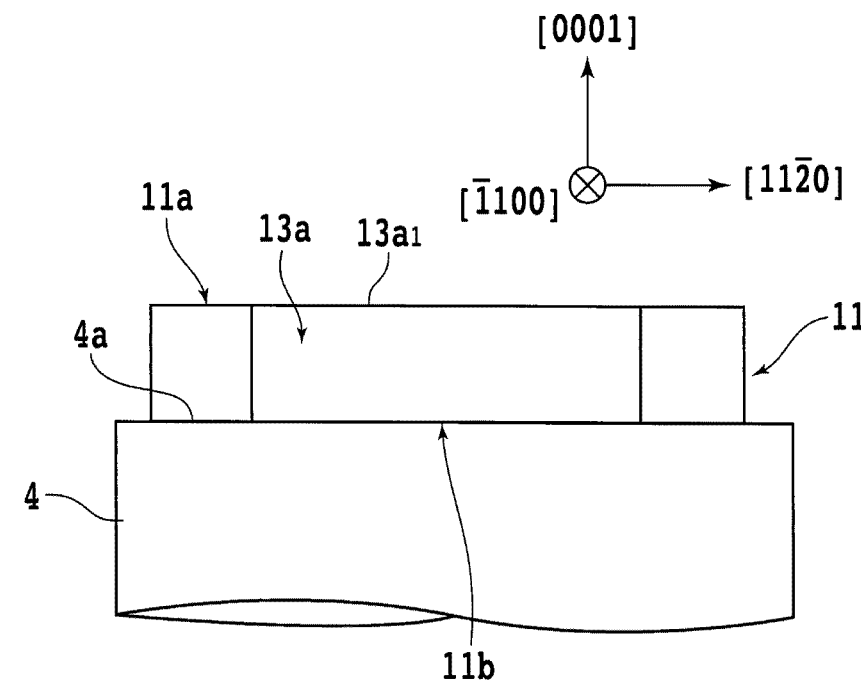
FIG. 5 is a side view illustrating a holding step.
Figure 5:
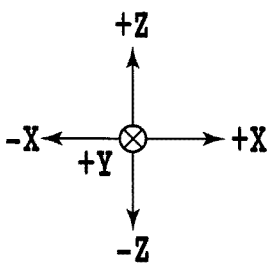

FIG. 5 is a side view illustrating the holding step S10 in which the second surface 11b of the ingot 11 is sucked and held by the holding surface 4a. In the holding step S10, the ingot 11 is sucked and held by the holding surface 4a in a mode in which the second surface lib is in contact with the holding surface 4a and the first surface 11a is exposed upward. In addition, in the holding step S10, a displacement of the first orientation flat $13a_1$ with respect to the X-axis direction of the laser processing apparatus 2 is identified by imaging the first surface 11a side by the imaging unit after the suction and holding. Thereafter, the first orientation flat $13a_1$ is made substantially parallel with the X-axis direction by rotating the chuck table 4 by the rotational driving mechanism so as to cancel out the displacement.

Figure 6:
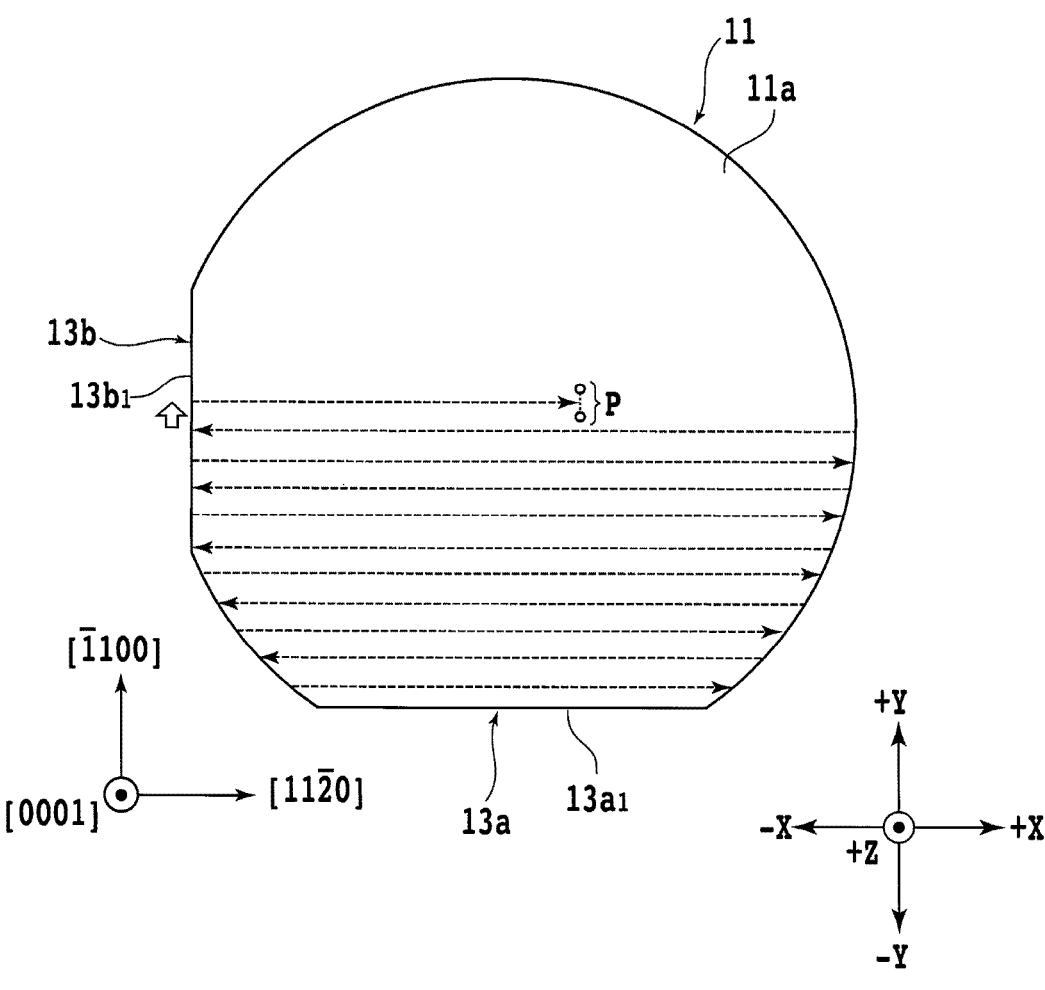
FIG. 6 is a plan view illustrating a separation layer forming step.

After the holding step S10, a separation layer 11d (see FIG. 8A) is formed at a predetermined depth position from the first surface 11a by irradiating the ingot 11 with the branched laser beam $L_C$ from the first surface 11a side (separation layer forming step S20). FIG. 6 is a plan view illustrating the separation layer forming step S20. Incidentally, in order to facilitate understanding, FIG. 6 represents two condensing points constituting the plurality of condensing points P by relatively large circles, and omits a few condensing points located between the two condensing points P.

In the separation layer forming step S20, in a state in which each of the condensing points P is positioned at a predetermined depth position lie (see FIG. 3 and FIG. 8A) of the ingot 11 so as to be aligned along the Y-axis direction, the plurality of condensing points P and the ingot 11 (that is, the chuck table 4) are moved along the X-axis direction at a predetermined relative speed (that is, a processing feed speed $V_X$). In the separation layer forming step S20, in a state in which the plurality of condensing points P are held stationary, for example, the chuck table 4 sucking and holding the ingot 11 is moved in the −X direction at a predetermined speed, the chuck table 4 is thereafter indexing-fed by a predetermined indexing amount, and the chuck table 4 is then moved in the +X direction at the same predetermined speed. This is repeated to thereby form the separation layer 11d within the ingot 11.

In FIG. 6, a movement path of the plurality of condensing points P in the ingot 11 is indicated by a broken line arrow. However, instead of relatively moving the plurality of condensing points P in the +X direction and the −X direction alternately, the plurality of condensing points P may be relatively moved only in the +X direction or may be relatively moved only in the −X direction. In addition, the plurality of condensing points P may be moved at the predetermined speed in a state in which the chuck table 4 sucking and holding the ingot 11 is held stationary, or both of the chuck table 4 sucking and holding the ingot 11 and the plurality of condensing points P may be moved.

In a case where the relative movement direction of the plurality of condensing points P and the ingot 11 is along the X-axis direction, the movement direction is parallel with crystal directions illustrated in the following (8).

[Math. 8]

$$[11\bar{2}0], [\bar{1}\bar{1}20] \tag{8}$$

Incidentally, as illustrated in the following (9), the two crystal directions illustrated in (8) are two of six equivalent crystal directions in the ingot 11 having a hexagonal crystal structure.

[Math. 9]

$$\langle 11\bar{2}0 \rangle = [11\bar{2}0], [\bar{1}2\bar{1}0], [\bar{2}110], [\bar{1}\bar{1}20], [1\bar{2}10], [2\bar{1}\bar{1}0]. \tag{9}$$

Incidentally, the relative movement direction of the plurality of condensing points P and the ingot 11 does not have to be perfectly parallel with the crystal directions identified by (8), but there may be an angle of 5° or less formed between the relative movement direction of the plurality of condensing points P and the ingot 11 and the crystal directions identified by (8) in the c-plane (see the foregoing (2)). Similarly, an angle formed between the relative movement direction of the plurality of condensing points P and the ingot 11 and the crystal directions identified by (9) may be equal to or less than 5°. The applicant confirmed in an experiment that the separation layer 11$d$ is formed even in this case. An example of processing conditions used in the separation layer forming step S20 are illustrated in the following.

Wavelength: 1064 nm

Amount of indexing feed: 106 μm (that is, an indexing amount)

Burst count: 10 (that is, the number of minimum unit pulses 12$b$ included in a pulse group 12$a$)

Branch count: 10 (that is, the number of branches of the laser beam L$_C$)

Path count: 1

Spot diameter of each condensing point: approximately 5 μm

Depth position of condensing point: 170 μm from the first surface 11$a$.

The intervals between the condensing points adjacent to each other in the Y-axis direction under the processing conditions are set at 12.5 μm, for example. Hence, in a case where 10 condensing points P are arranged, the laser beam L$_C$ is applied to a range of 112.5 μm (=12.5 μm×9). Incidentally, in the present embodiment, the repetition frequency f of the laser beam L$_{Ci}$ is set so as to be able to form the separation layer 11$d$ according to the pulse energy of the laser beams L$_{Ci}$ and the processing feed speed V$_X$.

Here, the pulse energy is energy temporally corresponding to one pulse group 12$a$ (that is, per pulse in a burst mode). In a case where the laser beams L$_{Ci}$ are spatially branched, the pulse energy is energy corresponding to one branched laser beam L$_{Ci}$. Incidentally, the laser beam L$_C$ may not be branched. The pulse energy in the present embodiment is set as appropriate so as to reduce damage to optical parts.

In addition, the processing feed speed V$_X$ is set at a value that does not extremely decrease throughput in a mass production process. Then, the repetition frequency f of the laser beam L$_{Ci}$ is set so as to be able to form the separation layer 11$d$ even in a case where this pulse energy and this processing feed speed V$_X$ are adopted. Hence, even in a case where the pulse energy is relatively decreased and the processing feed speed V$_X$ is relatively raised (that is, the throughput is increased), the separation layer 11$d$ can be formed by setting the repetition frequency f relatively high. Hence, an extreme decrease in the throughput can be prevented.

Figure 7:
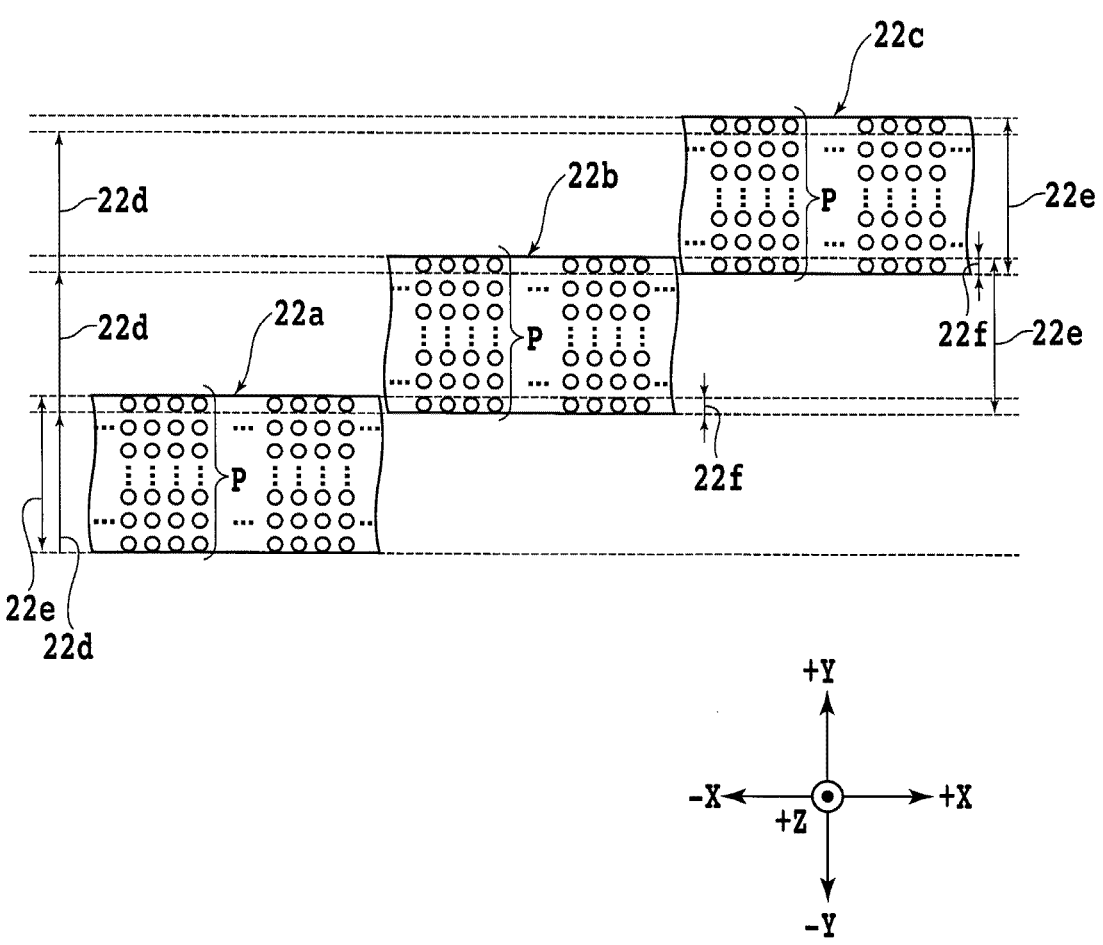
FIG. 7 is a schematic diagram illustrating trajectories of movement of a plurality of condensing points.

In a case where the plurality of condensing points P are relatively moved along the X-axis direction, a trajectory of the movement of the plurality of condensing points P is included in a first movement region 22$a$ illustrated in FIG. 7. Incidentally, FIG. 7 illustrates only a part of the first movement region 22$a$ having a longitudinal part along the X-axis direction.

After the plurality of condensing points P are relatively moved from one end to another end of the first surface 11$a$ in the X-axis direction, an indexing feed is performed by a predetermined indexing amount 22$d$ by moving the irradiation head 20 and the chuck table 4 relative to each other along the Y-axis direction. Then, the plurality of condensing points P are similarly moved relatively along the X-axis direction. A trajectory of the movement of the plurality of condensing points P is included in a second movement region 22$b$ illustrated in FIG. 7. Incidentally, FIG. 7 illustrates only a part of the second movement region 22$b$ having a longitudinal part along the X-axis direction.

Next, after the indexing feed is performed by the predetermined indexing amount 22$d$, the plurality of condensing points P are relatively moved along the X-axis direction. A trajectory of the movement of the plurality of condensing points P is included in a third movement region 22$c$ illustrated in FIG. 7. Incidentally, FIG. 7 also illustrates only a part of the third movement region 22$c$ having a longitudinal part along the X-axis direction.

FIG. 7 is a schematic diagram illustrating the trajectories of the movement of the plurality of condensing points P. The first movement region 22$a$, the second movement region 22$b$, and the third movement region 22$c$ have substantially the same width 22$e$ in the Y-axis direction. The width 22$e$ in the above-described processing conditions is 112.5 μm. On the other hand, the indexing amount 22$d$ in the above-described processing conditions is 106 μm. Thus, an overlap width 22$f$ of the first movement region 22$a$ and the second movement region 22$b$ and an overlap width 22$f$ of the second movement region 22$b$ and the third movement region 22$c$ are each 6.5 μm.

At each of the condensing points P and in the vicinity thereof, the crystallinity of the ingot 11 changes due to multiphoton absorption. For example, in a region in which multiphoton absorption has occurred, a fragile modified region whose mechanical strength is decreased as compared with a region in which multiphoton absorption has not occurred is formed. In addition, with the modified region as a starting point, cracking (cracks) extends along an XY plane direction. In the present embodiment, a region in a state in which a plurality of modified regions arranged in a lattice manner and cracks in a predetermined plane within the ingot 11 are formed, and the plurality of modified regions are connected to each other by the cracks will be referred to as a separation layer 11$d$.

Figures 8A, 8B:
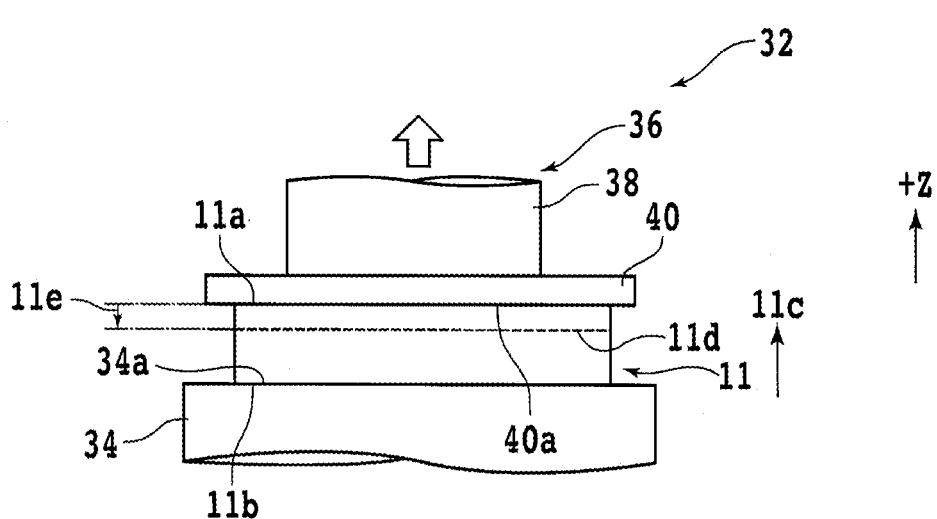

After the separation layer 11$d$ is thus formed along the XY plane direction at the predetermined depth position lie of the ingot 11 in the separation layer forming step S20, the ingot 11 is separated into the wafer 15 and another ingot 17 by using a separating apparatus 32 illustrated in FIG. 8A with the separation layer 11$d$ as a starting point (separating step S30).

Here, the separating apparatus 32 will be described with reference to FIG. 8A. The separating apparatus 32 has a chuck table 34 having substantially a same diameter as the above-described chuck table 4. The structure of the chuck table 34 is substantially the same as that of the chuck table 4. The upper surface of the chuck table 34 functions as a holding surface 34*a* that sucks and holds the second surface 11*b* of the ingot 11 by a negative pressure.

A separating unit 36 is provided above the chuck table 34. The separating unit 36 has a cylindrical movable portion 38 having a longitudinal part disposed along the Z-axis direction. A Z-axis direction moving mechanism (not illustrated) is coupled to the movable portion 38, so that the movable portion 38 is movable along the Z-axis direction.

The Z-axis direction moving mechanism is, for example, a ball screw type moving mechanism. However, the Z-axis direction moving mechanism may be constituted by another actuator. A bottom portion of the movable portion 38 is provided with a suction head 40 in a disk shape. As with the chuck table 34, the suction head 40 includes a frame body and a porous plate. The lower surfaces of the frame body and the porous plate are arranged so as to be substantially flush with each other and substantially parallel with the XY plane, and function as a holding surface 40*a* for holding the first surface 11*a* of the ingot 11 by a negative pressure.

FIG. 8A is a diagram illustrating the separating step S30. In the separating step S30, the second surface 11*b* of the ingot 11 is sucked and held by the holding surface 34*a* of the chuck table 34, and the first surface 11*a* is sucked and held by the holding surface 40*a* of the suction head 40. Next, an external force is applied to the ingot 11.

The external force is applied by, for example, driving in a wedge (not illustrated) into the side surface of the ingot 11 at a height position of the separation layer 11*d*. The wedge is preferably driven in at a plurality of positions along the circumferential direction of the ingot 11 rather than at only one position of the side surface of the ingot 11. When the external force is applied, the cracks are further extended in the XY plane direction at the depth position lie at which the separation layer 11*d* is formed.

Incidentally, the external force may be applied by applying an ultrasonic wave (that is, an elastic vibration wave in a frequency band exceeding 20 kHz) to the ingot 11 in place of driving in the wedge. In a case where an ultrasonic wave is applied, the ultrasonic wave is applied to the first surface 11*a* side via a liquid such as pure water before the first surface 11*a* is sucked and held by the holding surface 40*a* of the suction head 40. Specifically, the liquid to which the ultrasonic wave is applied is jetted from a nozzle to the ingot 11, or the ultrasonic wave is applied from a horn to the first surface 11*a* side via the liquid.

Incidentally, the applicant confirmed in an experiment that undesirable cracks occur when the external force is applied to the whole of the first surface 11*a* side at once. Accordingly, in a case where the nozzle or the horn is used, the external force is first applied to a local region with a diameter of approximately 5 mm to 50 mm on the first surface 11*a* side by using the ultrasonic wave. Next, the external force is applied to another region on the first surface 11*a* side by moving the nozzle or the horn and the chuck table 34 relative to each other. When the region to which the external force is applied is thus gradually moved on the first surface 11*a* side, the cracks between the modified regions can be extended along the first surface 11*a*.

When the cracks are further sufficiently connected between the modified regions adjacent to one another by the application of the external force, the mechanical strength of the separation layer 11*d* is further weakened as compared with regions other than the separation layer 11*d* of the ingot 11. Hence, the wafer 15 can be separated from the ingot 11 with a small force as compared with a case where the external force is not applied. After the external force is applied, the suction head 40 is raised (that is, moved in the +Z direction). The wafer 15 is thereby separated from the ingot 11 with the separation layer 11*d* as a starting point.

FIG. 8B is a diagram illustrating the wafer 15 separated from the ingot 11 and the like. Incidentally, the above-described application of the external force may be performed in parallel with the raising of the suction head 40. After the separating step S30, the upper surface side of the other ingot 17 which upper surface side corresponds to the separation layer 11*d* is subjected to grinding and/or polishing. The other ingot 17 is thereby treated as a new ingot 11 at a time of manufacturing of a second wafer 15.

The separation layer 11*d* has a thickness of approximately 50 μm to 60 μm (for example, 58 μm) in the thickness direction 11*c*. The thickness of the separation layer 11*d* corresponds to the above-described cutting margin, and is small as compared with the cutting margin (for example, 0.30 mm) of a wire saw, that is, approximately ⅙ to ⅕ of the cutting margin of the wire saw. When the ingot 11 is thus laser-processed, the cutting margin in the thickness direction 11*c* of the ingot 11 can be reduced as compared with a case where the wire saw is used. Hence, the productivity of the wafer 15 at a time of manufacturing of the wafer 15 from the ingot 11 is improved.

Incidentally, in the foregoing example, description has been made of the formation of the separation layer 11*d* by arranging the plurality of condensing points P at the predetermined depth position lie of the ingot 11. However, it is also possible to form the separation layer 11*d* at the predetermined depth position lie of a single crystal substrate (that is, a workpiece) of GaN in a flat plate shape instead of the ingot 11, the single crystal substrate being thinner than the ingot 11, and separate the wafer 15 from the single crystal substrate. In this case, it suffices to use a single crystal substrate of GaN thicker than the thickness (that is, a length in the direction of the c-axis) of the wafer 15 after the separation. That is, the wafer 15 has a thickness less than the thickness of the single crystal substrate of GaN.

(Details of Separation Layer Forming Step S20)

In the separation layer forming step S20 described above, even in a case where the pulse energy is relatively decreased and the processing feed speed $V_X$ is relatively raised (that is, the throughput is increased), the separation layer 11*d* is formed by setting the repetition frequency f relatively high. Where the separation layer 11*d* includes a plurality of modified regions as described above, a distance (that is, a pitch) between a plurality of modified regions adjacent to each other along the X-axis direction is a value obtained by dividing the processing feed speed $V_X$ by the repetition frequency f of the pulse group 12*a* (that is, $V_X$/f).

However, when the pitch at which the modified regions are formed in the X-axis direction is too large, the modified regions are not connected to each other by the cracks. In a case of adopting a relatively low predetermined pulse energy and a relatively high predetermined processing feed speed $V_X$, there is a problem in that the modified regions are thus not connected to each other by the cracks. In order to solve this problem, the applicant has conceived promoting the extension of the cracks between the modified regions by bringing the modified regions into proximity to each other to such a degree that the heat of the laser beam used for the formation of an immediately preceding modified region can be utilized for the formation of a next modified region.

That is, the heat of the laser beam used for the formation of the immediately preceding modified region is utilized for the formation of the next modified region by setting the repetition frequency f of the pulse group 12*a* relatively high according to the predetermined pulse energy and the predetermined processing feed speed $V_X$, and thereby bringing the modified regions into proximity to each other. A more reliable formation of the separation layer $11d$ in this manner has been conceived.

Technical concepts of the present application include, bearing an efficient utilization of the heat of the laser beam in mind, forming the separation layer $11d$ more reliably by adjusting the repetition frequency f of the pulse group $12a$ according to the predetermined pulse energy and the predetermined processing feed speed $V_X$.

Incidentally, when modified regions are to be similarly formed in an ingot of lithium tantalate (LT), cracks extending in an unexpected direction are formed because the heat of the laser beam is not readily dissipated in the ingot of LT as compared with the ingot 11 of GaN. That is, unexpected cracks are formed in the ingot of LT when the heat of the laser beam used for the formation of an immediately preceding modified region is to be utilized for the formation of a next modified region in the ingot of LT.

Accordingly, it is considered to be preferable not to actively utilize the heat generated during laser processing in order to form an appropriate separation layer $11d$ in the ingot of LT. On the other hand, in the present application, which has an objective of forming an appropriate separation layer $11d$ in an ingot of GaN (or a single crystal substrate of GaN), the repetition frequency f is set in order to actively utilize the heat generated during laser processing.

Figure 9:
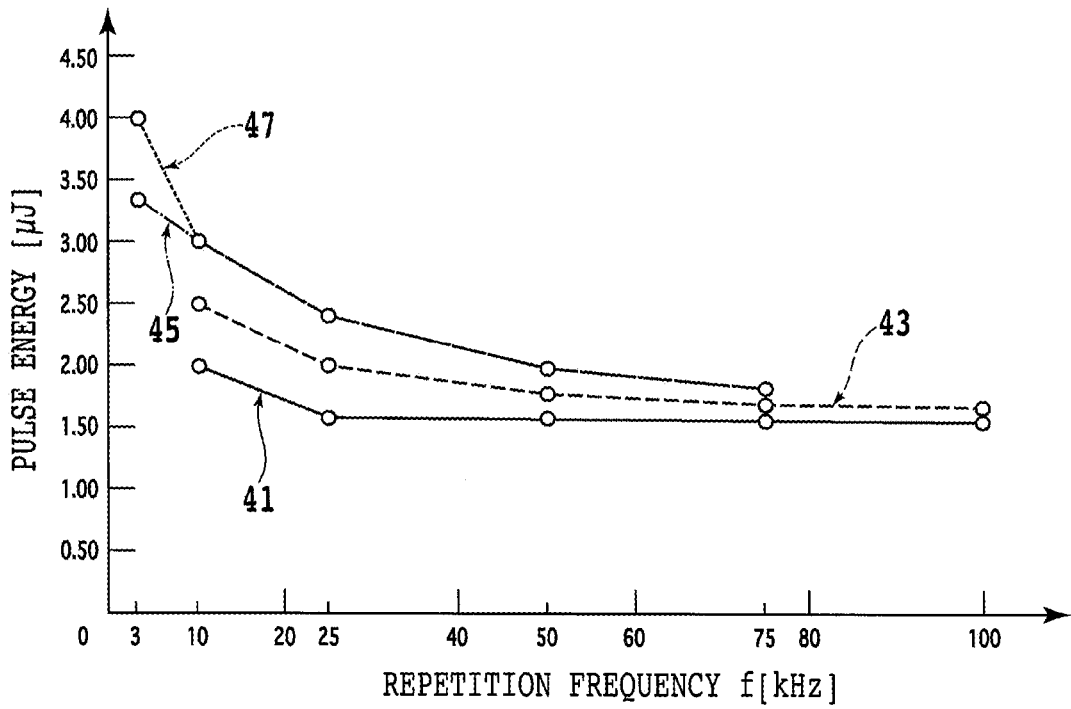
FIG. 9 is a graph illustrating a result of an experiment in which minimum values of pulse energy when a separation layer is formed are determined in a case where the pitch of modified regions is fixed.

Next, an experiment related to the formation of the separation layer $11d$ will be described with reference to FIGS. 9 to 11. FIG. 9 is a graph illustrating a result of an experiment in which minimum values of the pulse energy when the separation layer $11d$ was formed were determined in a case where the pitch of the modified regions in the processing feed direction was fixed. An axis of abscissas in the graph of FIG. 9 represents the repetition frequency f (kHz) of a pulse group $12a$ in the laser beam $L_{Ci}$, and an axis of ordinates in the same graph represents pulse energy (μJ).

The processing conditions were set to be the same as in the separation layer forming step S20 described above. In the present experiment, however, the pitch of the modified regions formed periodically in the X-axis direction was fixed at a plurality of values, that is, 10.0 μm, 12.5 μm, 15.0 μm, and 17.5 μm. In FIG. 9, an experiment result for a pitch of 10.0 μm is indicated by a polygonal line graph 41 of a solid line, an experiment result for a pitch of 12.5 μm is indicated by a polygonal line graph 43 of a broken line, an experiment result for a pitch of 15.0 μm is indicated by a polygonal line graph 45 of alternate long and short dashed lines, and an experiment result for a pitch of 17.5 μm is indicated by a polygonal line graph 47 of a dotted line. Incidentally, in a range in which the repetition frequency f is 10 kHz to 75 kHz, the experiment result for the pitch of 15.0 μm (polygonal line graph 45 of the alternate long and short dashed lines) and the experiment result for the pitch of 17.5 μm (polygonal line graph 47 indicated by the dotted line) coincide with each other.

In the experiment, laser processing was performed by a procedure described in the separation layer forming step S20 by increasing the pulse energy stepwise after setting, in advance, the repetition frequency f and the processing feed speed $V_X$ realizing the predetermined pitch. Specifically, in a case where the repetition frequency f was set at 10 kHz and the processing feed speed $V_X$ was set at 100 mm/s in order to realize the pitch of 10.0 μm, laser processing was first performed with the pulse energy fixed at a first value lower than 2.0 μJ.

After the laser processing, an operator determined whether or not the separation layer $11d$ was formed on the basis of an image obtained by imaging the first surface $11a$ side by a visible light camera. The separation layer $11d$ was not formed when the pulse energy was the first value. Next, the pulse energy was slightly increased from the first value, the laser processing was similarly performed, and the operator determined whether or not the separation layer $11d$ was formed.

As a result of thus increasing the pulse energy stepwise and sequentially performing the laser processing and the photograph determination, the pulse energy was 2.0 μJ when the separation layer $11d$ was formed for the first time in a case where the pitch was set at 10.0 μm, the repetition frequency f was set at 10 kHz, and the processing feed speed $V_X$ was set at 100 mm/s.

Next, in order to realize the pitch of 10.0 μm, the repetition frequency f was set at 25 kHz, and the processing feed speed $V_X$ was set at 250 mm/s. Then, the pulse energy was increased stepwise, and the laser processing and the photograph determination were sequentially performed. As a result, the pulse energy when the separation layer $11d$ was formed for the first time was 1.6 μJ.

Incidentally, because the laser beam $L_C$ is branched into 10 laser beams, a total average power (W) of the laser beams $L_{Ci}$ emitted from the condensing lens is Average Power (W)=10×Pulse Energy (μJ)×Repetition Frequency f (kHz).

For example, in a case where the repetition frequency f is 10 kHz, and the pulse energy is 2.00 μJ, the average power is 0.20 W. In a case where the repetition frequency f is 25 kHz, and the pulse energy is 1.60 μJ, the average power is 0.40 W. However, in the experiment, the laser processing is performed after the repetition frequency f and the total average power of the laser beams $L_{Ci}$ emitted from the condensing lens are specified in the laser processing apparatus 2. Thus, the pulse energy was calculated by (Average Power of $\Sigma L_{Ci}$)/(Branch Count i×Repetition Frequency f).

Here, the average power of $\Sigma L_{Ci}$ refers to a total average power of the i branched (in the present embodiment i=10) laser beams $L_{Ci}$ (in the present embodiment, i=1, 2 . . . 10) emitted from the condensing lens of the irradiation head 20. In the present embodiment, the laser beam $L_C$ is spatially branched into 10 laser beams. Thus, the pulse energy is calculated by adding together the average powers of the 10 branched laser beams $L_{Ci}$ and dividing the result by 10.

Similarly, in order to realize the pitch of 10.0 μm, the repetition frequency f was set at 50 kHz, and the processing feed speed $V_X$ was set at 500 mm/s. Then, the pulse energy was increased stepwise, and the laser processing and the photograph determination were sequentially performed. As a result, the pulse energy when the separation layer $11d$ was formed for the first time was 1.60 μJ.

In addition, in order to realize the pitch of 10.0 μm, the repetition frequency f was set at 75 kHz, and the processing feed speed $V_X$ was set at 750 mm/s. Then, the pulse energy was increased stepwise, and the laser processing and the photograph determination were sequentially performed. As a result, the pulse energy when the separation layer $11d$ was formed for the first time was 1.60 μJ.

Further, in order to realize the pitch of 10.0 μm, the repetition frequency f was set at 100 kHz, and the processing feed speed $V_X$ was set at 1000 mm/s. Then, the pulse energy was increased stepwise, and the laser processing and the photograph determination were sequentially performed. In this case, the pulse energy when the separation layer $11d$ was formed for the first time was 1.60 µJ. An experiment result in the case where the pitch was 10.0 µm is illustrated in Table 1.

TABLE 1

| | | | | |
|---|---|---|---|---|
| | | Pitch of 10.0 µm | | |
| | Repetition Frequency f (kHz) | Processing Feed Speed $V_X$ (mm/s) | Average Power (W) | Pulse Energy (µj) |
| #1 | 10 | 100 | 0.20 | 2.00 |
| #2 | 25 | 250 | 0.40 | 1.60 |
| #3 | 50 | 500 | 0.80 | 1.60 |
| #4 | 75 | 750 | 1.20 | 1.60 |
| #5 | 100 | 1000 | 1.60 | 1.60 |

Next, similarly, in order to realize the pitch of 12.5 µm, the repetition frequency f and the processing feed speed $V_X$ were each set. Then, the pulse energy was increased stepwise, the laser processing and the photograph determination were sequentially performed, and the pulse energy when the separation layer 11d was formed for the first time was calculated. An experiment result in the case where the pitch was 12.5 µm is illustrated in Table 2. Incidentally, the pulse energy of #4 in Table 2 is 1.73333 . . . , and is therefore illustrated in a state of being rounded off to two decimal places.

TABLE 2

| | | | | |
|---|---|---|---|---|
| | | Pitch of 12.5 µm | | |
| | Repetition Frequency f (kHz) | Processing Feed Speed $V_X$ (mm/s) | Average Power (W) | Pulse Energy (µj) |
| #1 | 10 | 125.0 | 0.25 | 2.50 |
| #2 | 25 | 312.5 | 0.50 | 2.00 |
| #3 | 50 | 625.0 | 0.90 | 1.80 |
| #4 | 75 | 937.5 | 1.30 | 1.73 |
| #5 | 100 | 1250.0 | 1.70 | 1.70 |

Next, similarly, in order to realize the pitch of 15.0 µm, the repetition frequency f and the processing feed speed $V_X$ were each set. Then, the pulse energy was increased stepwise, the laser processing and the photograph determination were sequentially performed, and the pulse energy when the separation layer 11d was formed for the first time was calculated. An experiment result in the case where the pitch was 15.0 µm is illustrated in Table 3. Incidentally, the pulse energy of #1 in Table 3 is 3.33333 . . . , and the pulse energy of #5 in the same table is 1.86666 . . . , so that the pulse energies are illustrated in a state of being rounded off to two decimal places.

TABLE 3

| | | | | |
|---|---|---|---|---|
| | | Pitch of 15.0 µm | | |
| | Repetition Frequency f (kHz) | Processing Feed Speed $V_X$ (mm/s) | Average Power (W) | Pulse Energy (µj) |
| #1 | 3 | 45 | 0.10 | 3.33 |
| #2 | 10 | 150 | 0.30 | 3.00 |
| #3 | 25 | 375 | 0.60 | 2.40 |
| #4 | 50 | 750 | 1.00 | 2.00 |
| #5 | 75 | 1125 | 1.40 | 1.87 |

Next, similarly, in order to realize the pitch of 17.5 µm, the repetition frequency f and the processing feed speed $V_X$ were each set. Then, the pulse energy was increased stepwise, the laser processing and the photograph determination were sequentially performed, and the pulse energy when the separation layer 11d was formed for the first time was calculated. An experiment result in the case where the pitch was 17.5 µm is illustrated in Table 4. Incidentally, the pulse energy of #5 in Table 4 is 1.86666 . . . , and is therefore illustrated in a state of being rounded off to two decimal places.

TABLE 4

| | | | | |
|---|---|---|---|---|
| | | Pitch of 17.5 µm | | |
| | Repetition Frequency f (kHz) | Processing Feed Speed $V_X$ (mm/s) | Average Power (W) | Pulse Energy (µj) |
| #1 | 3 | 52.5 | 0.12 | 4.00 |
| #2 | 10 | 175.0 | 0.30 | 3.00 |
| #3 | 25 | 437.5 | 0.60 | 2.40 |
| #4 | 50 | 875.0 | 1.00 | 2.00 |
| #5 | 75 | 1312.5 | 1.40 | 1.87 |

The pulse energies illustrated in FIG. 9 and Tables 1 to 4 represent values when the separation layer 11d is formed for the first time after the repetition frequency f and the processing feed speed $V_X$ are set such that the pitch is equal to or more than 10.0 µm and equal to or less than 17.5 µm. That is, in the case where the pitch is set at 10.0 µm, the separation layer 11d can be formed when pulse energies in a range having the polygonal line graph 41 as a lower limit (that is, in a range equal to or more than the polygonal line graph 41) are used. The same applies to the other polygonal line graphs 43, 45, and 47.

As is clear from the experiment results, in the case of the pitch of 10.0 µm, when the repetition frequency f is set at 10 kHz, a pulse energy equal to or higher than 2.00 µJ is necessary to form the separation layer 11d, while in a range in which the repetition frequency f is equal to or higher than 25 kHz, the separation layer 11d can be formed when a lower limit value of the pulse energy is set to be equal to or higher than 1.60 µJ. In addition, in the case of the pitch of 17.5 µm, when the frequency f is set at 3 kHz, a pulse energy equal to or higher than 4.00 µJ is necessary to form the separation layer 11d, while the lower limit value of the pulse energy can be lowered to below 4.00 µJ as the repetition frequency f is increased.

For example, in the case of the pitch of 17.5 µm, when the frequency f is set at 75 kHz, the separation layer 11d can be formed even with the pulse energy set to be equal to or higher than 1.87 µJ. Thus, the lower limit value of the pulse energy can be set to be equal to or higher than 1.6 µJ and equal to or lower than 4.0 µJ according to the pitch of the modified regions and the repetition frequency f. In particular, when the repetition frequency f is set to be equal to or higher than 25 kHz, the lower limit value of the pulse energy with which the separation layer 11d can be formed can be relatively lowered, and when the repetition frequency f is set to be equal to or higher than 50 kHz, the lower limit value of the pulse energy with which the separation layer 11d can be formed can be lowered more. In addition, when the repetition frequency f is set to be equal to or higher than 75 kHz, the lower limit value of the pulse energy with which the separation layer 11d can be formed can be further lowered.

In addition, the processing feed speed $V_X$ can be set to be equal to or higher than 100 mm/s, as illustrated in #1 and the like of Table 1, and can also be set to be equal to or higher than 250 mm/s, as illustrated in #2 and the like of Table 1.

From a viewpoint of the throughput, the processing feed speed $V_X$ is preferably set to be equal to or higher than 500 mm/s, as illustrated in #3 and the like of Table 1, the processing feed speed $V_X$ is more preferably set to be equal to or higher than 750 mm/s, as illustrated in #4 of Table 1, #4 of Table 3, and the like, and the processing feed speed $V_X$ is even more preferably set to be equal to or higher than 1000 mm/s, as illustrated in #5 of Table 1 and the like.

Now, consideration will be given to changes in the minimum value of the pulse energy with which the separation layer 11$d$ can be formed in a case where the pitch is fixed. The polygonal line graphs 41, 43, 45, and 47 illustrated in FIG. 9 have a downwardly recess shape as if a straight line that is parallel with the axis of abscissas and where the pulse energy is a predetermined value in the vicinity of 1.60 µJ and a straight line that is parallel with the axis of ordinates and where the repetition frequency f is 0 kHz are asymptotes. The slopes of the polygonal line graphs are steep particularly in a range in which the repetition frequency f is equal to or higher than 3 kHz and equal to or lower than 25 kHz.

In view of such points, an effect of utilizing the heat of the laser beam used to form an immediately preceding modified region for the formation of a next modified region at a time of formation of the separation layer 11$d$ can be said to increase noticeably as the repetition frequency f is increased in the range in which the repetition frequency f is equal to or higher than 3 kHz and equal to or lower than 25 kHz. However, when the repetition frequency f is over 25 kHz and equal to or lower than 75 kHz, the effect of utilizing the heat is not improved so much even when the repetition frequency f is increased. When the repetition frequency f is over 75 kHz, the effect of utilizing the heat is hardly improved even when the repetition frequency f is increased. That is, a degree of improvement in the effect of utilizing the heat reaches saturation in a range over 75 kHz.

Next, consideration will be given to the length of the pitch. Considering a mechanism of ordinary heat conduction, the smaller the pitch of the modified regions, the more easily the heat of the laser beam used for the formation of the immediately preceding modified region is utilized for the formation of the next modified region. In view of the experiment results described above, the pitch at which the separation layer 11$d$ can be formed is preferably equal to or less than 17.5 µm.

Figure 10:
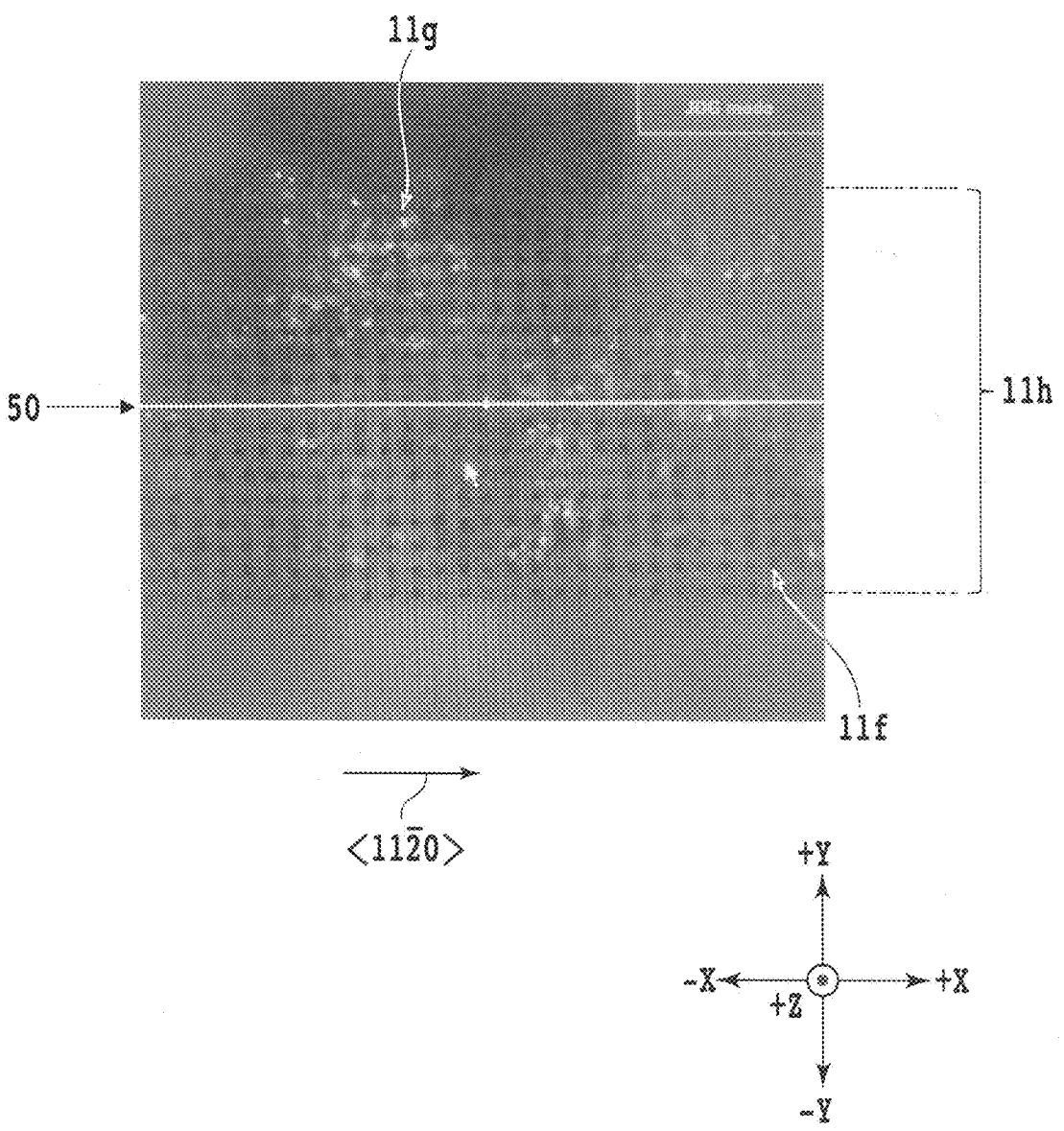
FIG. 10 is a photograph of a single crystal substrate in which sufficient cracks are not formed between modified regions.

FIG. 10 is a photograph of a single crystal substrate in which sufficient cracks 11$g$ were not formed between modified regions 11$f$ (that is, the separation layer 11$d$ was not formed). FIG. 11 is a photograph of a single crystal substrate in which sufficient cracks 11$g$ were formed between modified regions 11$f$ (that is, the separation layer 11$d$ was formed). The photographs were obtained by photographing the single crystal substrates by a visible light camera after performing laser processing on the single crystal substrates of GaN according to the processing conditions used in the separation layer forming step S20 described above.

Figure 11:
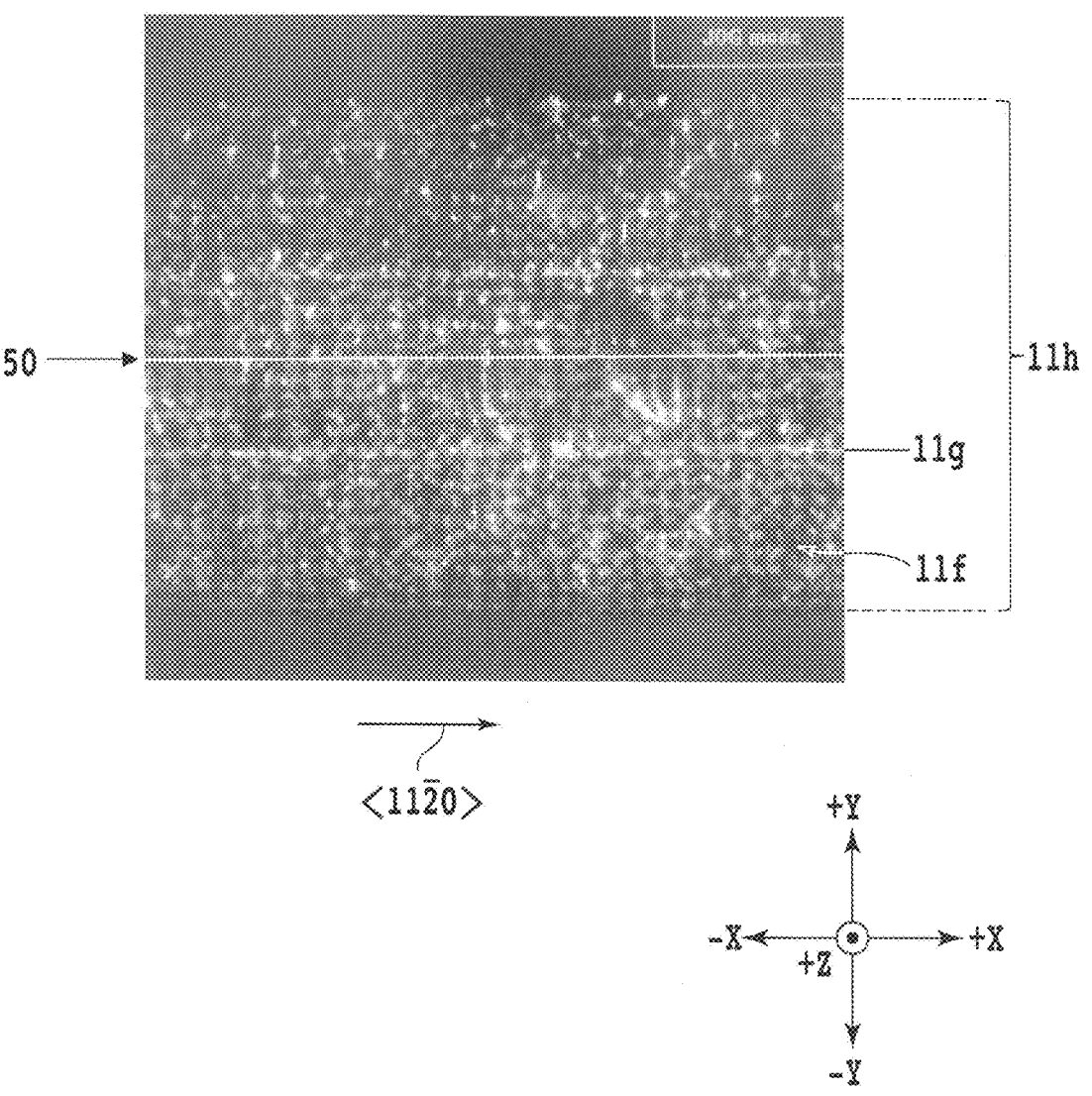
FIG. 11 is a photograph of a single crystal substrate in which sufficient cracks are formed between modified regions.

Straight lines that cross central portions of the images illustrated in FIG. 10 and FIG. 11 in a horizontal direction are reference lines 50 displayed so as to cross the center of an imaging field of view. The reference lines 50 are not formed in the ingot 11 but are displayed in the images. In addition, band-shaped linear regions 11$h$ in the images are regions that have been subjected to laser processing along a crystal direction illustrated in the following (10).

[Math. 10]

$$\langle 11\bar{2}0 \rangle \qquad (10)$$

The modified regions 11$f$ are formed in regions displayed in black circles in the images. The cracks 11$g$ are formed in bright regions between the modified regions 11$f$. In FIG. 10, the cracks 11$g$ are formed between the modified regions 11$f$ only sporadically. In FIG. 11, the cracks 11$g$ are formed between most of the modified regions 11$f$.

Modifications

Figure 12A:
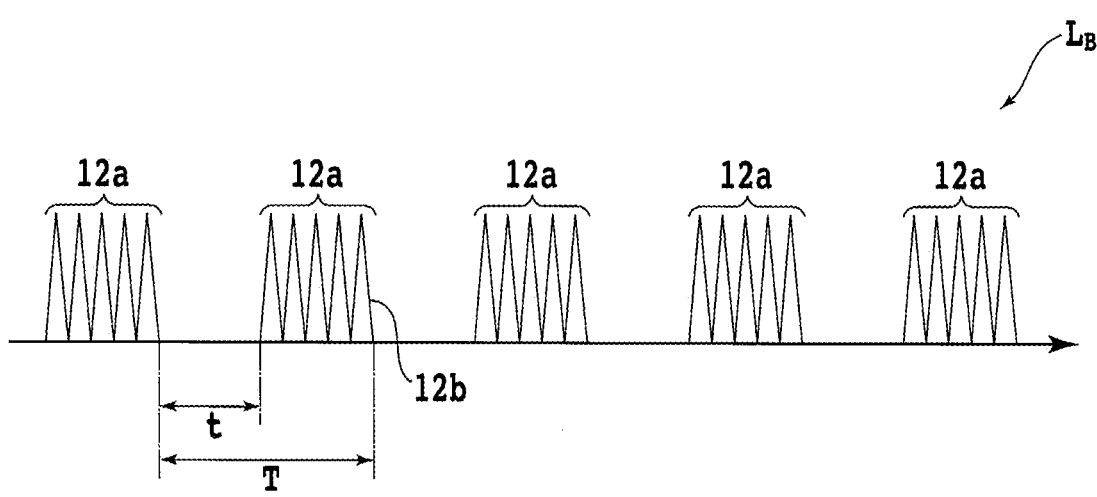
FIG. 12A is a schematic diagram of a laser beam $L_B$ according to a first modification.

Next, modifications will be described with reference to FIG. 12A and FIG. 12B. FIG. 12A is a schematic diagram of the pulsed laser beam $L_B$ according to a first modification and is a schematic diagram of the laser beam $L_B$ before becoming the laser beam $L_C$ by being spatially branched by the branching unit 16. In the first modification, 5 minimum unit pulses 12$b$, rather than 10 minimum unit pulses 12$b$, are included in a pulse group 12$a$. This one pulse group 12$a$ is one pulse corresponding to the pulse energy. Of course, the laser beam $L_C$ may be branched, or may not be branched. The mode of FIG. 12A can be realized by, for example, adjusting a manner of thinning out the laser beam $L_A$ by the acousto-optic modulator 12. However, this mode may be realized by decreasing the frequency of the laser beam $L_A$ emitted from the laser oscillator 10.

Figure 12B:
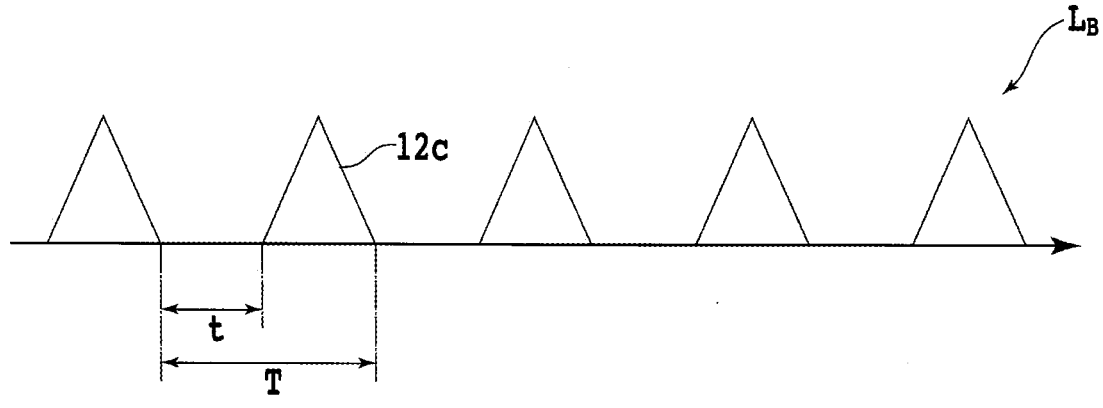
FIG. 12B is a schematic diagram of a laser beam $L_B$ according to a second modification.

FIG. 12B is a schematic diagram of a pulsed laser beam $L_B$ according to a second modification. As in the first modification, FIG. 12B is a schematic diagram of the laser beam $L_B$ before becoming the laser beam $L_C$ by being spatially branched by the branching unit 16. In the laser beam $L_B$ in the second modification, one pulse 12$c$ is constituted by one pulse 12$b$ having a pulse width of a time corresponding to a pulse group 12$a$ (that is, (T-t)).

This one pulse 12$c$ is one pulse corresponding to the pulse energy. Of course, the laser beam $L_C$ may be branched or may not be branched. As the laser beam $L_B$ in the second modification, a pulsed laser beam $L_B$ having the repetition frequency f can be generated by, for example, adjusting the frequency of exciting light (that is, seed light) to the laser medium with the acousto-optic modulator 12 omitted.

Also in the first modification and the second modification, even in a case where the pulse energy is relatively decreased and the processing feed speed $V_X$ is relatively raised (that is, the throughput is increased), the separation layer 11$d$ can be formed by setting the repetition frequency f relatively high. Hence, an extreme decrease in the throughput can be prevented.

Incidentally, the processing feed direction as a relative movement direction of the condensing points and the ingot 11 (that is, the workpiece) is not limited to only <11-20>±5° in the (0001) plane. According to an experiment of the applicant, it was found that the pulse energy can be decreased when the relative movement direction of the condensing points and the ingot 11 is set to be <10-10>±10° in the (0001) plane at a time of formation of the separation layer 11$d$ in which the modified regions 11$f$ formed so as to be adjacent to each other within a plane are connected to each other by the cracks 11$g$.

(Experiment Indicating Relation Between Crystal Directions and Crack Formation)

Figure 13:
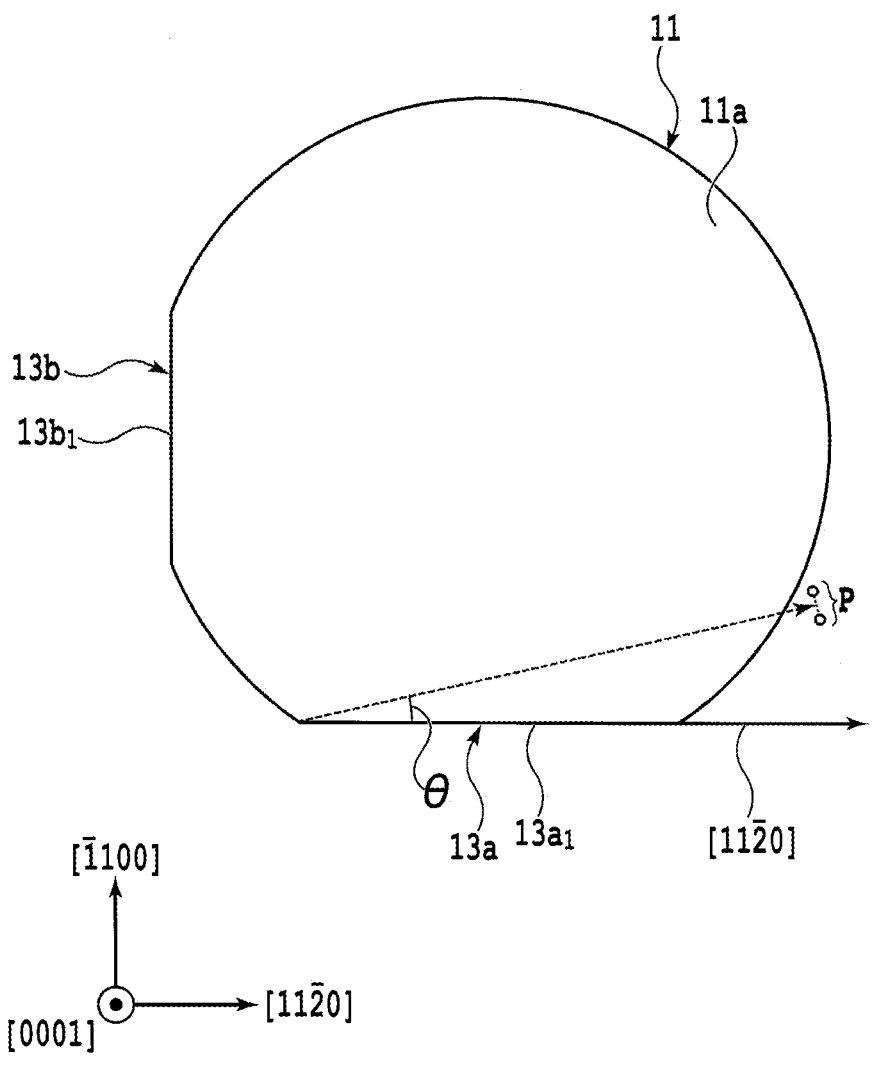
FIG. 13 is a plan view of the ingot, the plan view illustrating an angle θ formed between a predetermined direction and the movement direction of a plurality of condensing points in an experiment for evaluating the crystal direction dependence of minimum pulse energy with which cracks are formed.

Next, referring to FIGS. 13 to 14C, description will be made of a result of an experiment for investigating a relation between minimum pulse energy with which the cracks $11g$ connecting the adjacent modified regions $11f$ to each other can be formed and the movement direction of the plurality of pieces of condensing points P that linearly move on the c-plane. FIG. 13 is a plan view of the ingot 11, the plan view indicating an angle θ formed between a predetermined direction (first orientation flat $13a_1$) and the movement direction of the plurality of condensing points P (that is, a scanning direction of the branched laser beam $L_C$) on the c-plane in an experiment for evaluating the crystal direction dependence of the minimum pulse energy with which the cracks $11g$ are formed. Incidentally, also in the present experiment, a direction in which the plurality of condensing points P are branched is orthogonal to a direction in which the plurality of condensing points P move on the c-plane.

For example, θ=0° when the movement direction of the plurality of condensing points P is the crystal direction illustrated in the foregoing (6), and θ=90° when the movement direction of the plurality of condensing points P is the crystal direction illustrated in the foregoing (7). Processing conditions in the experiment were set as follows.

Wavelength: 1064 nm

Processing feed speed: 1000 mm/s

Repetition frequency: 50 kHz

Burst count: 10 (number of pulses included in a pulse group $12a$)

Branch count: 10 (number of branches of laser beam $L_C$)

Path count: 1

Spot diameter of each condensing point: approximately 5 μm

Interval between condensing points adjacent to each other: 12.5 μm

Depth position of condensing points: approximately 170 μm into the ingot 11 from the first surface $11a$ Pitch: 20 μm (=(1000 mm/s)/(50 kHz))

In the present experiment, first, the value of 0 was set at 0°, and the pulse energy was fixed at a predetermined value. Then, the first surface $11a$ (that is, the c-plane) was scanned by the branched laser beam $L_C$. Next, the value of 0 was fixed at 0°, and the average power of the laser beam $L_C$ emitted from the condensing lens was increased by 0.05 W. As a result of thus increasing the pulse energy stepwise, a minimum average power with which the cracks $11g$ connecting the adjacent modified regions $11f$ to each other were able to be formed was 1.25 W (0=0°) That is, the minimum pulse energy was 2.50 μJ (=1.25 W/(10×50 kHz)).

Next, θ was increased by 10°, and then the average power of the laser beam $L_C$ emitted from the condensing lens was similarly increased stepwise. As a result, the minimum average power was 1.10 W (8=10°). That is, the minimum pulse energy was 2.20 μJ (=1.10 W/(10×50 kHz)). Similarly, θ was increased in units of 10°, and at each angle, a search was made for the minimum average power with which the cracks $11g$ connecting the adjacent modified regions $11f$ to each other were able to be formed.

As a result, the minimum average powers were respectively 2.10 μJ (8=20°), 2.10 μJ (8=30°), 2.10 μJ (8=40°), 2.20 μJ (8=50°), 2.50 μJ (8=60°), 2.20 μJ (8=70°), 2.10 μJ (8=80°), and 2.10 μJ (8=90°).

FIG. 14A is a graph illustrating the minimum pulse energy with which the cracks $11g$ are formed with respect to the angle θ. FIG. 14B is a plan view of the ingot 11 when 0=30°. FIG. 14C is a plan view of the ingot 11 when 0=90°. As illustrated in FIG. 14A, the pulse energy is at a minimum in a range in which 0 is equal to or more than 20° and equal to or less than 40° (that is, 30°−10°≤θ≤30°+10°). That is, the scanning direction of the branched laser beam $L_C$ is preferably in a range of a crystal direction illustrated in the following Expression (11)±10° in the c-plane.

[Math. 11]

$$[01\bar{1}0] \tag{11}$$

Here, as for 0, there are only experiment results up to 90°. However, considering that the ingot 11 is hexagonal, and that the ingot 11 has a 60° rotational symmetry about the c-axis in the c-plane, it is reasonably presumed that the same is true for a range in which 0 is equal to or more than 80° and equal to or less than 100° (that is, 90°−10°≤θ≤90°+10°). That is, it can be said that the scanning direction of the laser beam $L_{Ci}$ is preferably in a range of the crystal direction illustrated in the following Expression (7)±10° in the c-plane.

In addition, considering the 60° rotational symmetry, it can be said that the scanning direction of the branched laser beam $L_C$ is similarly desirably in ranges of six equivalent crystal directions illustrated in the foregoing (1)±10° in the c-plane. That is, it can be reasonably presumed that when the scanning direction of the branched laser beam $L_C$ is set in the ranges of the six equivalent crystal directions illustrated in the foregoing (1)±10° in the c-plane, the cracks $11g$ connecting the adjacent modified regions $11f$ to each other can be formed without the pulse energy being excessively increased.

Figure 15:
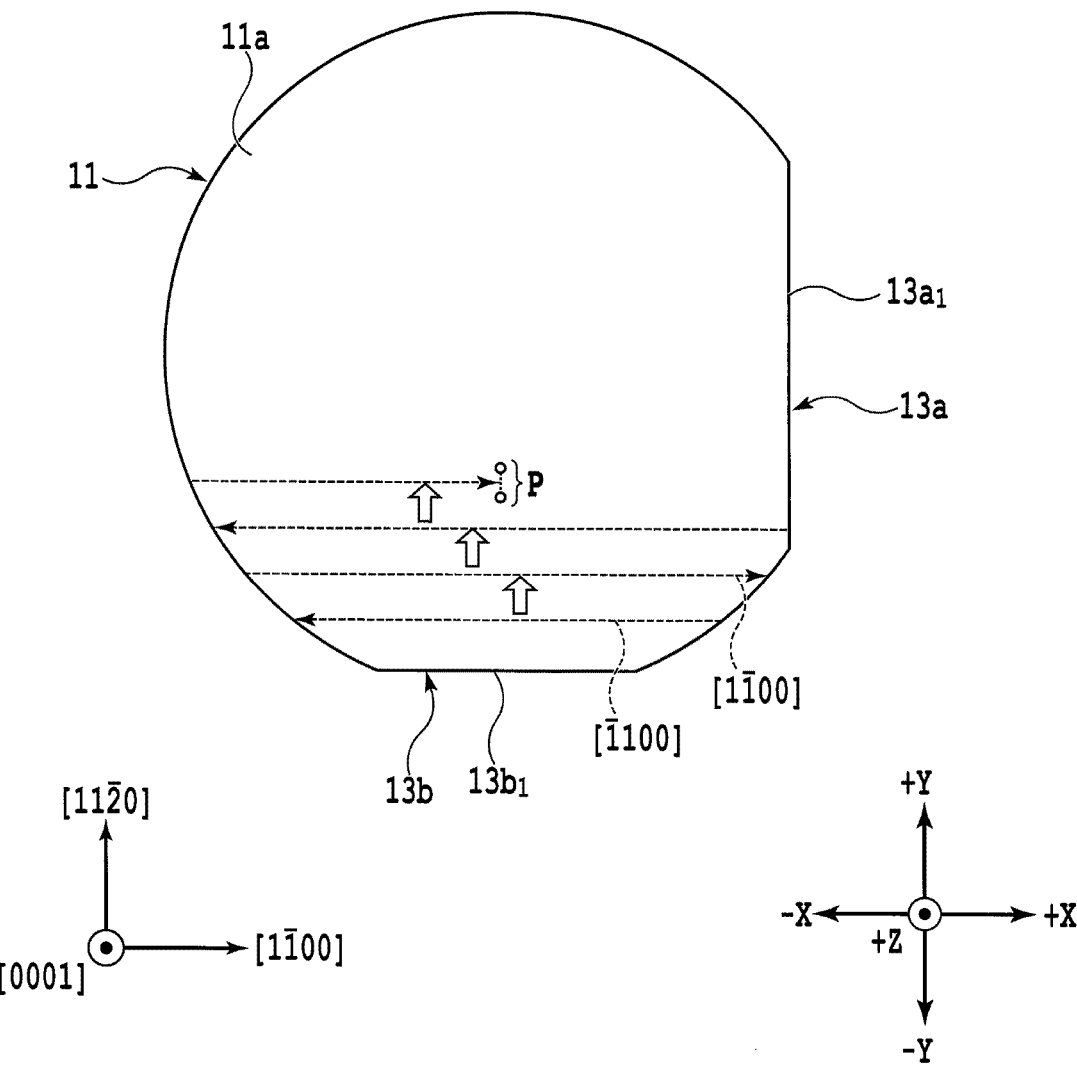
FIG. 15 is a plan view illustrating a separation layer forming step according to a third modification.

FIG. 15 is a plan view illustrating a separation layer forming step S20 according to a third modification. Incidentally, in order to facilitate understanding, FIG. 15 represents two of the plurality of condensing points P by relatively large circles, and omits a few condensing points located between the two condensing points P. In the separation layer forming step S20 in the third modification, first, the orientation of the chuck table 4 is adjusted such that the second orientation flat $13b_1$ of the ingot 11 becomes substantially parallel with the X-axis direction.

Then, the plurality of condensing points P are relatively moved in the −X direction, and thereafter the plurality of condensing points P are relatively moved in the +X direction. The movement in the −X direction and the movement in the +X direction is thus repeated alternately. Incidentally, in FIG. 15, a movement path of the plurality of condensing points P in the ingot 11 is indicated by a broken line arrow. Instead of alternately moving the plurality of condensing points P in the −X direction and the +X direction, the plurality of condensing points P may be moved only in the −X direction or may be moved only in the +X direction. In a case where the relative movement direction of the plurality of condensing points P and the ingot 11 is along the X-axis direction, the movement direction is parallel with crystal directions illustrated in the following (12).

[Math. 12]

$$[\bar{1}100], [1\bar{1}00] \tag{12}$$

Incidentally, as illustrated in the following (13), the two crystal directions illustrated in (12) are two of six equivalent crystal directions in the ingot 11 having a hexagonal crystal structure.

[Math. 13]

$$\langle 10\overline{1}0 \rangle = [10\overline{1}0], [\overline{1}010], [\overline{1}100], [1\overline{1}00], [01\overline{1}0], [0\overline{1}10] \qquad (13)$$

Of course, as is clear from the above-described experiment, an angle formed between the relative movement direction of the plurality of condensing points P and the ingot 11 and the crystal directions represented by (1) (that is, (13)) in the (0001) plane of the ingot 11 is equal to or less than 100.

Besides, structures, methods, and the like according to the foregoing embodiment can be modified and implemented as appropriate without departing from the objective scope of the present invention.

For example, whether or not the separation layer 11*d* is formed may be determined by the computer that performs image processing on an image obtained by imaging the first surface 11*a* side by a visible light camera in place of the operator. In a case where the computer is used, artificial intelligence (AI) may be made to perform deep learning on the basis of learning data including images including the separation layer 11*d* and images not including the separation layer 11*d*, so that AI may be made to determine the presence or absence of the separation layer 11*d* in an unknown image.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A wafer manufacturing method for manufacturing, from a workpiece as an ingot of gallium nitride or a single crystal substrate of gallium nitride, a wafer of gallium nitride having a thickness smaller than a thickness of the workpiece, the wafer manufacturing method comprising:

a holding step of holding one surface side of the workpiece by a holding table;

a separation layer forming step of forming a separation layer including a plurality of modified regions within the workpiece by moving the workpiece and a condensing point of a pulsed laser beam having a wavelength transmittable through the workpiece relative to each other at a predetermined speed along a processing feed direction in a state in which the workpiece is irradiated with the pulsed laser beam from another surface side of the workpiece, the other surface side being located on an opposite side from the one surface of the workpiece, and the condensing point of the pulsed laser beam is located at a predetermined depth position of the workpiece; and a separating step of separating the wafer from the workpiece with the separation layer as a starting point, wherein, in the separation layer forming step, a repetition frequency of the pulsed laser beam is set according to pulse energy as energy of the pulsed laser beam per pulse and the relative predetermined speed between the workpiece and the condensing point such that the separation layer is formed;

wherein the repetition frequency is a frequency defined by a reciprocal of a cycle of a plurality of pulse groups in the laser beam in a burst mode, in the separation layer forming step, the laser beam being applied in a burst mode.

2. The wafer manufacturing method according to claim 1, wherein, in the separation layer forming step, the repetition frequency of the pulsed laser beam is set to be equal to or higher than 25 KHz.

3. The wafer manufacturing method according to claim 1, wherein, in the separation layer forming step, the repetition frequency of the pulsed laser beam is set to be equal to or higher than 50 kHz.

4. The wafer manufacturing method according to claim 1, wherein, in the separation layer forming step, the predetermined speed is set such that a distance between the plurality of modified regions adjacent to each other along the processing feed direction is equal to or less than 17.5 μm.

5. The wafer manufacturing method according to claim 4, wherein, in the separation layer forming step, a lower limit value of the pulse energy of the pulsed laser beam per pulse is set to be equal to or higher than 1.60 μJ and equal to or lower than 4.00 μJ.

6. The wafer manufacturing method according to claim 1, wherein an angle formed between the processing feed direction in the separation layer forming step and crystal directions represented by $$< 10\overline{1}0 >$$

in a (0001) plane of the workpiece is equal to or less than 10°;

wherein the processing feed direction is linear.

7. The wafer manufacturing method according to claim 5, wherein even in a case where the pulse energy is relatively decreased and the relative predetermined speed between the workpiece and the condensing point is relatively raised (that is, throughput is increased), the separation layer is formed by setting the repetition frequency above a predetermined threshold, wherein the lower limit value of the pulse energy of the pulsed laser beam per pulse is set to be equal to or higher than 1.60 μJ and equal to or lower than 4.00 μJ, the predetermined speed is set between 250 mm/s and 1312.5 mm/s; and the repetition frequency of the pulsed laser beam is set to be equal to or higher than 25 kHz.

8. The wafer manufacturing method according to claim 1, wherein the ingot has a diameter of approximately 100 mm and a thickness of 500 μm.

9. The wafer manufacturing method according to claim 1, wherein, in the separation layer forming step, the repetition frequency of the pulsed laser beam is set equal to or higher than 1 kHz and equal to or lower than 100 KHz.

10. The wafer manufacturing method according to claim 1, wherein, in the separation layer forming step, a plurality of condensing points aligned with each other along a direction orthogonal the processing feed direction are formed to make corresponding orthogonally spaced modified regions, wherein intervals between the plurality of condensing points aligned with each other along the direction orthogonal the processing feed direction to are set at a predetermined value equal to or more than 5 μm and equal to or less than 20 μm.

11. The wafer manufacturing method according to claim 10, wherein, the intervals between the plurality of condensing points aligned with each other along the direction orthogonal the processing feed direction to are set to 12.5 μm.

12. The wafer manufacturing method according to claim 1, wherein, in the separating step, the another surface side of the workpiece is sucked and held by a suction head and the one surface side of the workpiece is held by a chuck table and the suction head and the chuck table are moved relatively apart from each other.

13. The wafer manufacturing method according to claim 12, wherein, in the separating step, prior to the suction head and the chuck table being moved relatively apart from each other, an external force is applied to the workpiece.

14. The wafer manufacturing method according to claim 1, wherein the wafer has a thickness of approximately 50 μm to 60 μm.

15. The wafer manufacturing method according to claim 1, wherein a pitch between a plurality of modified regions adjacent to each other along the processing feed direction is a value obtained by dividing the predetermined speed by the repetition frequency, wherein the pitch is set such a degree that the heat of the laser beam used for the formation of an immediately preceding modified region can be utilized for the formation of a next modified region.

16. The wafer manufacturing method according to claim 15, wherein the pitch is set to 10 μm, the pulse energy is set to at least 2 μJ when the repetition frequency is set to 10 kHz, and the predetermined speed is set to 100 mm/s;

the pulse energy is set to at least 1.6 μJ when the repetition frequency is set to 25 kHz, and the predetermined speed is set to 250 mm/s;

the pulse energy is set to at least 1.6 μJ when the repetition frequency is set to 50 kHz, and the predetermined speed is set to 500 mm/s;

the pulse energy is set to at least 1.6 μJ when the repetition frequency is set to 75 kHz, and the predetermined speed is set to 750 mm/s; and the pulse energy is set to at least 1.6 μJ when the repetition frequency is set to 100 kHz, and the predetermined speed is set to 100 mm/s.

17. The wafer manufacturing method according to claim 16, wherein the pitch is set to 12.5 μm, the pulse energy is set to at least 2.5 μJ when the repetition frequency is set to 10 kHz, and the predetermined speed is set to 125 mm/s;

the pulse energy is set to at least 2 μJ when the repetition frequency is set to 25 kHz, and the predetermined speed is set to 312.5 mm/s;

the pulse energy is set to at least 1.8 μJ when the repetition frequency is set to 50 kHz, and the predetermined speed is set to 625 mm/s;

the pulse energy is set to at least 1.73 μJ when the repetition frequency is set to 75 kHz, and the predetermined speed is set to 937.5 mm/s; and the pulse energy is set to at least 1.7 μJ when the repetition frequency is set to 100 kHz, and the predetermined speed is set to 1250 mm/s.

18. The wafer manufacturing method according to claim 15, wherein the pitch is set to 15 μm, the pulse energy is set to at least 3.33 μJ when the repetition frequency is set to 3 kHz, and the predetermined speed is set to 45 mm/s;

the pulse energy is set to at least 3 μJ when the repetition frequency is set to 10 kHz, and the predetermined speed is set to 150 mm/s;

the pulse energy is set to at least 2.4 μJ when the repetition frequency is set to 25 kHz, and the predetermined speed is set to 375 mm/s;

the pulse energy is set to at least 2 μJ when the repetition frequency is set to 50 kHz, and the predetermined speed is set to 750 mm/s;

the pulse energy is set to at least 1.87 μJ when the repetition frequency is set to 75 kHz, and the predetermined speed is set to 1125 mm/s.

19. The wafer manufacturing method according to claim 1, wherein heat of the laser beam used for the formation of the immediately preceding modified region is utilized for the formation of a next modified region by setting the repetition frequency relatively high according to the predetermined pulse energy and the predetermined speed, and thereby bringing the modified regions into proximity to each other.

* * * * *